(12) United States Patent
Dabbagh

(10) Patent No.: US 11,582,073 B1
(45) Date of Patent: Feb. 14, 2023

(54) SEQUENCE ESTIMATION SYSTEM AND METHOD

(71) Applicant: MELLANOX TECHNOLOGIES, LTD., Yokneam (IL)

(72) Inventor: Amir Dabbagh, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/588,360

(22) Filed: Jan. 31, 2022

(51) Int. Cl.
*H04L 25/03* (2006.01)

(52) U.S. Cl.
CPC .. *H04L 25/03267* (2013.01); *H04L 25/03178* (2013.01)

(58) Field of Classification Search
CPC ......... H04L 25/03006; H04L 25/03057; H04L 25/03178; H04L 25/03267; H04L 25/085
USPC ....... 375/232, 233, 262, 340, 341, 346, 348, 375/350; 308/322, 323
See application file for complete search history.

(56) References Cited

U.S. PATENT DOCUMENTS

| | | | | |
|---|---|---|---|---|
| 2009/0193300 | A1* | 7/2009 | Xia | H04L 1/0071 714/701 |
| 2009/0238255 | A1* | 9/2009 | Chau | H04B 7/0891 375/227 |
| 2019/0319825 | A1* | 10/2019 | Shakiba | H04L 25/03312 |
| 2020/0220818 | A1* | 7/2020 | Kountouris | H04L 47/25 |

FOREIGN PATENT DOCUMENTS

CN 1242121 A * 1/2000 ....... H04L 25/03057

OTHER PUBLICATIONS

IEEE 802.Mar. 2018—IEEE Standard for Ethernet, "https://standards.ieee.org/standard/802_3-2018.htmr".
G. David Forney, "Maximum-Likelihood sequence estimation of Digital Sequences in the presence of intersymbol interference," IEEE Trans. Information Theory, vol. IT-18, No. 3, pp. 363-378, May 1972.
R. M. Fano, "A heuristic discussion of probabilistic decoding," IEEE Trans. Information Theory, vol. IT-9, pp. 64-74, Apr. 1963.

* cited by examiner

*Primary Examiner* — Young T. Tse
(74) *Attorney, Agent, or Firm* — Kligler & Associates Patent Attorneys Ltd

(57) ABSTRACT

A system comprising a processing circuitry configured to: obtain a first ordered sequence of symbols associated with a corresponding second ordered sequence of transmitted symbols and including one or more errors, the errors being discrepancies between given symbols of the first ordered sequence and corresponding symbols of the second ordered sequence; determine, for each symbol of the first ordered sequence of symbols, an estimated transmitted symbol, utilizing a Decision Feedback Equalizer (DFE); and determine if the estimated transmitted symbol of a given symbol of the first ordered sequence of symbols, satisfies a saturation threshold condition; and determine an error hypothesis identifying one or more of the errors by comparing the estimated transmitted symbol of at least one symbol of the first ordered sequence of symbols with one or more pairs of thresholds.

27 Claims, 11 Drawing Sheets

```
┌─────────────────────────────────────────────────────────┐
│ calculate the one or more pairs of thresholds, for each symbol │
│ within a symbols window comprised of the given symbol, and a   │
│ predetermined number of symbols preceding the given symbol     │──910
│ in the first ordered sequence of symbols, wherein each pair is │
│ comprised of: (i) a symbol-associated low threshold, and (ii) a│
│         symbol-associated high threshold                        │
└─────────────────────────────────────────────────────────┘
                              ↓
┌─────────────────────────────────────────────────────────┐
│ characterize each symbol of the symbols window, as potentially │
│ erroneous upon the estimated transmitted symbol of the given   │
│ symbol being below the symbol-associated low threshold of the  │──920
│ respective symbol or above the symbol-associated high          │
│ threshold of the respective symbol, to obtain characterization │
│                         results                                 │
└─────────────────────────────────────────────────────────┘
                              ↓
┌─────────────────────────────────────────────────────────┐
│ select the error hypothesis from one or more hypotheses        │──930
│   determined utilizing the characterization results            │
└─────────────────────────────────────────────────────────┘
```

SEQUENCE ESTIMATION SYSTEM AND METHOD

TECHNICAL FIELD

The presently disclosed subject matter relates to a sequence estimation system and method.

BACKGROUND

Maximum Likelihood Sequence Estimation (MLSE) receiver can be implemented using the Viterbi algorithm. However, in high-speed communications, where the data rate can be on the order of tens of Giga Bits Per Second (Gbps), the implementation of such a receiver is very challenging and can be costly both in terms of size and power consumption.

For high-speed communications, the Decision Feedback Equalizer (DFE) plays a critical role in providing excellent performance with relatively low computational and hardware (HW) design complexity, as opposed to the MLSE receiver implemented using the Viterbi algorithm. However, with the introduction of new communication standards which are using much higher signal bandwidths (BW) combined with new channel model definitions having an increased amount of Insertion Loss (IL), a more sophisticated receiver design is required in order to meet increasing performance targets.

There is thus a need in the art for a new sequence estimation system and method.

GENERAL DESCRIPTION

In accordance with a first aspect of the presently disclosed subject matter, there is provided a system comprising a processing circuitry configured to: obtain a first ordered sequence of symbols associated with a corresponding second ordered sequence of transmitted symbols and including one or more errors, the errors being discrepancies between given symbols of the first ordered sequence and corresponding symbols of the second ordered sequence; determine, for each symbol of the first ordered sequence of symbols, an estimated transmitted symbol, utilizing a Decision Feedback Equalizer (DFE); determine if the estimated transmitted symbol of a given symbol of the first ordered sequence of symbols, satisfies a saturation threshold condition; and determine an error hypothesis identifying one or more of the errors by comparing the estimated transmitted symbol of at least one symbol of the first ordered sequence of symbols with one or more pairs of thresholds.

In one embodiment of the presently disclosed subject matter and/or embodiments thereof, the processing circuitry is further configured to: calculate the one or more pairs of thresholds, for each symbol within a symbols window comprised of the given symbol, and a predetermined number of symbols preceding the given symbol in the first ordered sequence of symbols, wherein each pair is comprised of: (i) a symbol-associated low threshold, and (ii) a symbol-associated high threshold; and characterize each symbol of the symbols window, as potentially erroneous upon the estimated transmitted symbol of the given symbol being below the symbol-associated low threshold of the respective symbol or above the symbol-associated high threshold of the respective symbol, to obtain characterization results.

In one embodiment of the presently disclosed subject matter and/or embodiments thereof, each pair is associated with a location of the given symbol in the symbol window and with an assumed location of the one or more errors in the symbol window.

In one embodiment of the presently disclosed subject matter and/or embodiments thereof, the processing circuitry is further configured to select the error hypothesis from one or more hypotheses determined utilizing the characterization results.

In one embodiment of the presently disclosed subject matter and/or embodiments thereof, the hypotheses include one or more single error hypotheses and one or more double error hypotheses.

In one embodiment of the presently disclosed subject matter and/or embodiments thereof, the selection of the error hypothesis is made by testing the hypotheses in a given order until reaching the error hypothesis that meets a condition, wherein the condition is that upon correcting errors in accordance with the error hypothesis, the estimated transmitted symbol determined for a given number of symbols of the first ordered sequence of symbols, immediately following a first symbol of the symbols window corrected in accordance with the error hypothesis, is not above the upper threshold or below the low threshold.

In one embodiment of the presently disclosed subject matter and/or embodiments thereof, the given order is a descending order of an amplitude of a difference between the symbols of the first ordered sequence of symbols that are associated with the hypotheses, and the respective estimated transmitted symbols.

In one embodiment of the presently disclosed subject matter and/or embodiments thereof, upon none of the error hypotheses meeting the condition, the selection of the error hypothesis is made so that upon correcting errors in accordance with the error hypothesis, a location of the estimated transmitted symbol determined for the given number of symbols of the first ordered sequence of symbols, immediately following the first symbol, that is above the upper threshold or below the low threshold, is farthest from the first symbol.

In one embodiment of the presently disclosed subject matter and/or embodiments thereof, the processing circuitry is further configured to correct the errors according to the error hypothesis.

In one embodiment of the presently disclosed subject matter and/or embodiments thereof, the symbol-associated low threshold and the symbol-associated high threshold are calculated also based on an assumed number of errors within the symbols of the symbols window.

In one embodiment of the presently disclosed subject matter and/or embodiments thereof, the assumed number of errors is one and wherein: the symbol-associated low threshold equals $A_k^n e_n$; the symbol-associated upper threshold equals $M + A_k^n e_n$; $e_n$ is a sign operator of estimated noise added to the second ordered sequence of transmitted symbols before quantization which gave rise to the first ordered sequence of transmitted symbols; $A_k^n \equiv (-1)^{k-n+1}(k-n+1)$; n is a location of error within the symbols window; k is a running index within the symbols window; M is a maximal value of the symbols; and ≡ signifies a mathematical identity.

In one embodiment of the presently disclosed subject matter and/or embodiments thereof, the assumed number of errors is two and wherein: the symbol-associated low threshold equals $A_k^n e_n + A_k^p e_p$; the symbol-associated upper threshold equals $M + A_k^n e_n + A_k^p e_p$; $e_n$ and $e_p$ are sign operators of estimated noise added to the second ordered sequence of transmitted symbols before quantization which gave rise to the first ordered sequence of transmitted symbols; $A_k^n \equiv (-1)^{k-n+1}(k-n+1)$, and $A_k^p \equiv (-1)^{k-p+1}(k-p+1)$; n is a location of a first error within the symbols window; p is a location of a second error within the symbols window, succeeding the location of the first error; k is a running index within the symbols window; and M is a maximal value of the symbols.

In one embodiment of the presently disclosed subject matter and/or embodiments thereof, p=n+d, wherein d is a distance between the location of the first error and the location of the second error.

In one embodiment of the presently disclosed subject matter and/or embodiments thereof, the first ordered sequence of symbols is obtained by filtering and quantizing a received signal comprising the second ordered sequence of transmitted symbols transmitted via a channel.

In one embodiment of the presently disclosed subject matter and/or embodiments thereof, the symbol-associated low threshold and the symbol-associated high threshold are associated with a modulation of the received signal.

In one embodiment of the presently disclosed subject matter and/or embodiments thereof, the received signal is an M-array Pulse-Amplitude Modulation (PAM-M) modulated signal.

In one embodiment of the presently disclosed subject matter and/or embodiments thereof, the channel adds noise to a transmitted signal, to obtain the received signal.

In one embodiment of the presently disclosed subject matter and/or embodiments thereof, the received signal behaves like a class II Partial Response (PR2) channel signal, being a signal that passed through a PR2 channel.

In one embodiment of the presently disclosed subject matter and/or embodiments thereof, the filtering is performed using an equalizer filter.

In one embodiment of the presently disclosed subject matter and/or embodiments thereof, the equalizer filter is a three-tap class Partial Response (PR) channel-based equalizer.

In one embodiment of the presently disclosed subject matter and/or embodiments thereof, the three-tap class PR channel-based equalizer is a class II Partial Response (PR2) channel-based equalizer.

In one embodiment of the presently disclosed subject matter and/or embodiments thereof, the equalizer filter is one of: an analog equalizer filter, a digital equalizer filter, or a combination thereof.

In one embodiment of the presently disclosed subject matter and/or embodiments thereof, the quantizing is performed using a slicer.

In one embodiment of the presently disclosed subject matter and/or embodiments thereof, the DFE is a three-tap class Partial Response (PR) channel-based equalizer.

In one embodiment of the presently disclosed subject matter and/or embodiments thereof, the three-tap class PR channel-based equalizer is a class II Partial Response (PR2) channel-based equalizer.

In one embodiment of the presently disclosed subject matter and/or embodiments thereof, the saturation threshold condition is that the given symbol is below a low threshold or above an upper threshold.

In one embodiment of the presently disclosed subject matter and/or embodiments thereof, the upper threshold and the low threshold are associated with a modulation of a received signal comprising the second ordered sequence of transmitted symbols transmitted via a channel.

In accordance with a second aspect of the presently disclosed subject matter, there is provided a method comprising: obtaining, by a processing circuitry, a first ordered sequence of symbols associated with a corresponding second ordered sequence of transmitted symbols and including one or more errors, the errors being discrepancies between given symbols of the first ordered sequence and corresponding symbols of the second ordered sequence; determining, by the processing circuitry, for each symbol of the first ordered sequence of symbols, an estimated transmitted symbol, utilizing a Decision Feedback Equalizer (DFE); determining, by the processing circuitry, if the estimated transmitted symbol of a given symbol of the first ordered sequence of symbols, satisfies a saturation threshold condition; and determining, by the processing circuitry, an error hypothesis identifying one or more of the errors by comparing the estimated transmitted symbol of at least one symbol of the first ordered sequence of symbols with one or more pairs of thresholds.

In one embodiment of the presently disclosed subject matter and/or embodiments thereof, the method further comprises: calculating, by the processing circuitry, the one or more pairs of thresholds, for each symbol within a symbols window comprised of the given symbol, and a predetermined number of symbols preceding the given symbol in the first ordered sequence of symbols, wherein each pair is comprised of: (i) a symbol-associated low threshold, and (ii) a symbol-associated high threshold; and characterizing, by the processing circuitry, each symbol of the symbols window, as potentially erroneous upon the estimated transmitted symbol of the given symbol being below the symbol-associated low threshold of the respective symbol or above the symbol-associated high threshold of the respective symbol, to obtain characterization results.

In one embodiment of the presently disclosed subject matter and/or embodiments thereof, each pair is associated with a location of the given symbol in the symbol window and with an assumed location of the one or more errors in the symbol window.

In one embodiment of the presently disclosed subject matter and/or embodiments thereof, the method further comprises selecting the error hypothesis from one or more hypotheses determined utilizing the characterization results.

In one embodiment of the presently disclosed subject matter and/or embodiments thereof, the hypotheses include one or more single error hypotheses and one or more double error hypotheses.

In one embodiment of the presently disclosed subject matter and/or embodiments thereof, the selection of the error hypothesis is made by testing the hypotheses in a given order until reaching the error hypothesis that meets a condition, wherein the condition is that upon correcting errors in accordance with the error hypothesis, the estimated transmitted symbol determined for a given number of symbols of the first ordered sequence of symbols, immediately following a first symbol of the symbols window corrected in accordance with the error hypothesis, is not above the upper threshold or below the low threshold.

In one embodiment of the presently disclosed subject matter and/or embodiments thereof, the given order is a descending order of an amplitude of a difference between the symbols of the first ordered sequence of symbols that are associated with the hypotheses, and the respective estimated transmitted symbols.

In one embodiment of the presently disclosed subject matter and/or embodiments thereof, upon none of the error hypotheses meeting the condition, the selection of the error hypothesis is made so that upon correcting errors in accordance with the error hypothesis, a location of the estimated transmitted symbol determined for the given number of symbols of the first ordered sequence of symbols, immediately following the first symbol, that is above the upper threshold or below the low threshold, is farthest from the first symbol.

In one embodiment of the presently disclosed subject matter and/or embodiments thereof, the method further comprises correcting the errors according to the error hypothesis.

In one embodiment of the presently disclosed subject matter and/or embodiments thereof, the symbol-associated low threshold and the symbol-associated high threshold are calculated also based on an assumed number of errors within the symbols of the symbols window.

In one embodiment of the presently disclosed subject matter and/or embodiments thereof, the assumed number of errors is one and wherein: the symbol-associated low threshold equals $A_k^n e_n$; the symbol-associated upper threshold equals $M+A_k^n e_n$; $e_n$ is a sign operator of estimated noise added to the second ordered sequence of transmitted symbols before quantization which gave rise to the first ordered sequence of transmitted symbols; $A_k^n \equiv (-1)^{k-n+1}(k-n+1)$; n is a location of error within the symbols window; k is a running index within the symbols window; and M is a maximal value of the symbols.

In one embodiment of the presently disclosed subject matter and/or embodiments thereof, the assumed number of errors is two and wherein: the symbol-associated low threshold equals $A_k^n e_n + A_k^p e_p$; the symbol-associated upper threshold equals $M+A_k^n e_n + A_k^p e_p$; $e_n$ is a sign operator of estimated noise added to the second ordered sequence of transmitted symbols before quantization which gave rise to the first ordered sequence of transmitted symbols; $A_k^n \equiv (-1)^{k-n+1}(k-n+1)$; n is a location of a first error within the symbols window; p is a location of a second error within the symbols window, succeeding the location of the first error; k is a running index within the symbols window; and M is a maximal value of the symbols.

In one embodiment of the presently disclosed subject matter and/or embodiments thereof, p=n+d, wherein d is a distance between the location of the first error and the location of the second error.

In one embodiment of the presently disclosed subject matter and/or embodiments thereof, the first ordered sequence of symbols is obtained by filtering and quantizing a received signal comprising the second ordered sequence of transmitted symbols transmitted via a channel In one embodiment of the presently disclosed subject matter and/or embodiments thereof, the symbol-associated low threshold and the symbol-associated high threshold are associated with a modulation of the received signal.

In one embodiment of the presently disclosed subject matter and/or embodiments thereof, the received signal is an M-array Pulse-Amplitude Modulation (PAM-M) modulated signal.

In one embodiment of the presently disclosed subject matter and/or embodiments thereof, the channel adds noise to a transmitted signal, to obtain the received signal.

In one embodiment of the presently disclosed subject matter and/or embodiments thereof, the received signal behaves like a class II Partial Response (PR2) channel signal, being a signal that passed through a PR2 channel.

In one embodiment of the presently disclosed subject matter and/or embodiments thereof, the filtering is performed using an equalizer filter.

In one embodiment of the presently disclosed subject matter and/or embodiments thereof, the equalizer filter is a three-tap class Partial Response (PR) channel-based equalizer.

In one embodiment of the presently disclosed subject matter and/or embodiments thereof, the three-tap class PR channel-based equalizer is a class II Partial Response (PR2) channel-based equalizer.

In one embodiment of the presently disclosed subject matter and/or embodiments thereof, the equalizer filter is one of: an analog equalizer filter, a digital equalizer filter, or a combination thereof.

In one embodiment of the presently disclosed subject matter and/or embodiments thereof, the quantizing is performed using a slicer.

In one embodiment of the presently disclosed subject matter and/or embodiments thereof, the DFE is a three-tap class Partial Response (PR) channel-based equalizer.

In one embodiment of the presently disclosed subject matter and/or embodiments thereof, the three-tap class PR channel-based equalizer is a class II Partial Response (PR2) channel-based equalizer.

In one embodiment of the presently disclosed subject matter and/or embodiments thereof, the saturation threshold condition is that the given symbol is below a low threshold or above an upper threshold.

In one embodiment of the presently disclosed subject matter and/or embodiments thereof, the upper threshold and the low threshold are associated with a modulation of a received signal comprising the second ordered sequence of transmitted symbols transmitted via a channel.

In accordance with a third aspect of the presently disclosed subject matter, there is provided a non-transitory computer readable storage medium having computer readable program code embodied therewith, the computer readable program code, executable by at least one processing circuitry to perform a method comprising: obtaining, by a processing circuitry, a first ordered sequence of symbols associated with a corresponding second ordered sequence of transmitted symbols and including one or more errors, the errors being discrepancies between given symbols of the first ordered sequence and corresponding symbols of the second ordered sequence; determining, by the processing circuitry, for each symbol of the first ordered sequence of symbols, an estimated transmitted symbol, utilizing a Decision Feedback Equalizer (DFE); determining, by the processing circuitry, if the estimated transmitted symbol of a given symbol of the first ordered sequence of symbols, satisfies a saturation threshold condition; and determining, by the processing circuitry, an error hypothesis identifying one or more of the errors by comparing the estimated transmitted symbol of at least one symbol of the first ordered sequence of symbols with one or more pairs of thresholds.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 10 is a flowchart illustrating one example of a sequence of operations carried out for selecting an error hypothesis, in accordance with the presently disclosed subject matter;

DETAILED DESCRIPTION

Figure 1:
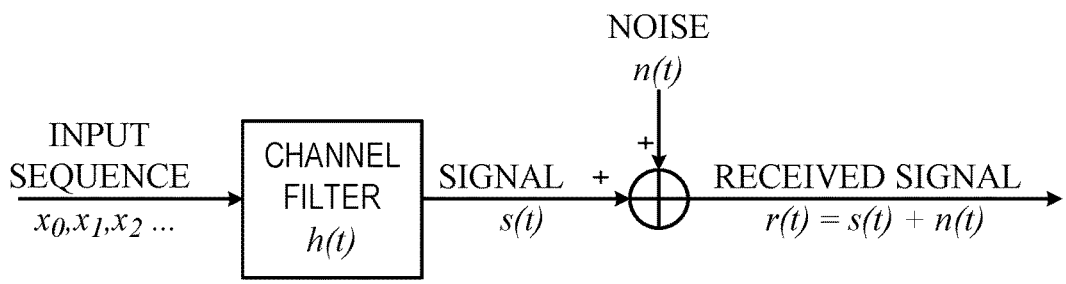
FIG. 1 is an exemplary illustration of a transmitter, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "determining", "calculating", "characterizing", "selecting", "correcting", "filtering", "quantizing", or the like, include action and/or processes of a computer that manipulate and/or transform data into other data, said data represented as physical quantities, e.g. such as electronic quantities, and/or said data representing the physical objects. The terms "computer", "processor", "processing resource", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 1-3 and 5-10 may be executed. In embodiments of the presently disclosed subject matter one or more stages illustrated in FIGS. 1-3 and 5-10 may be executed in a different order and/or one or more groups of stages may be executed simultaneously. FIG. 4 illustrates a general schematic of the system architecture in accordance with an embodiment of the presently disclosed subject matter. Each module in FIG. 4 can be made up of any combination of software, hardware and/or firmware that performs the functions as defined and explained herein. The modules in FIG. 4 may be centralized in one location or dispersed over more than one location. In other embodiments of the presently disclosed subject matter, the system may comprise fewer, more, and/or different modules than those shown in FIG. 4.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, in which an exemplary illustration of a transmitter, in accordance with the presently disclosed subject matter, is shown.

In the illustration, there is shown a Pulse-Amplitude Modulation (PAM)-M based modulated signal that gets transmitted through a channel (via a channel filter). An input sequence including symbols to be transmitted ($x_0$, $x_1$, $x_2$, . . . ) pass through the channel filter (denoted by h(t)) to form a channel signal (denoted s(t)) and additive noise (denoted by n(t)) is added to the channel signal to form the received signal (denoted r(t)) that will be received by a receiver, such as (however not thus limited) the one shown in FIG. 2.

Figure 2:
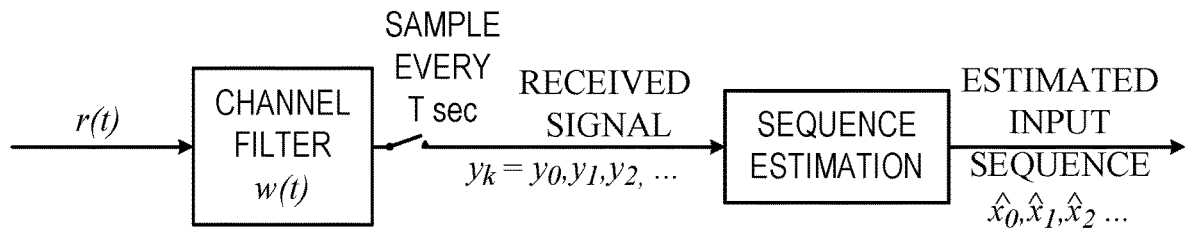
FIG. 2 is an exemplary illustration of a receiver, in accordance with the presently disclosed subject matter.

Turning to FIG. 2, there is shown an exemplary illustration of a receiver, in accordance with the presently disclosed subject matter.

The receiver shown in the figure is an exemplary receiver that can be used for estimating the input sequence (i.e. the sequence of transmitted symbols—$x_0$, $x_1$, $x_2$, . . . ) transmitted using the transmitter of FIG. 1. The receiver can employ a class II Partial Response (PR2) channel-based equalization. A PR2 based equalization receiver can be well suited to meet the performance challenges in high Insertion Loss (IL) channels. This type of receiver structure can reduce the amount of noise amplifications at the equalization stage (compared to a standard Feed-Forward Equalization (FFE) or PR1 equalization) optionally at the expense of increased amount of complexity at the subsequent decision stages that will be detailed herein.

The receiver receives the received signal (denoted r(t)) which is passed through an equalizer filter giving rise to a received sequence (denoted $y_k$). The equalizer filter can be implemented in the analog domain, digital domain, or in a mixture of both. The combination of the channel, the noise, and the equalizer settings, determine the structure of the received sequence and its statistics. The goal of the equalization process, that can optionally be implemented in other manners, is to achieve the desired PR channel response at the input to the sequence estimation block shown in the figure. In general, it can be assumed that $$y_k = \sum_{l=0}^{L-1} c_l x_{k-l} + w_k$$

where the set of parameters $c_0, c_1, \ldots, c_{L-1}$ denote the coefficients of the effective channel response, and $W_k$ denotes noise. Since in this detailed description we are considering a PR2 channel, L is equal to 3 and $$y_k = x_k + 2x_{k-1} + x_{k-2} + w_k.$$

The received sequence ($y_k$) is then processed by a sequence estimation component to give rise to an estimated input sequence ($\hat{x}_0$, $\hat{x}_1$, $\hat{x}_2$, . . . ), which is an estimation of the input sequence ($x_0$, $x_1$, $x_2$, . . . ) transmitted by the transmitter of FIG. 1.

The sequence estimation receiver algorithm described herein has a performance that is close to the optimal MLSE and computational complexity that is kept low for all Signal-to-Noise Ratio (SNR) levels. It is to be noted that although throughout the description reference is made to a PR2 based channel, the same design can be also applicable for other three-tap based classes of PR channels, mutatis mutandis. Without loss of generality, throughout the description we will assume that the PAM-M (e.g. PAM-2, PAM-4, etc.) modulated symbols are normalized to the range [0, 1, . . . , M–1].

The sequence estimation receiver algorithm described herein can come close to within 0.2 dB from the optimal MLSE performance. In the high SNR region (the region where the BER is, for example, below $10^{-4}$), the computational complexity demonstrated by the sequence estimation receiver algorithm disclosed herein (measured as the average amount of essential operations per sample) is similar to a standard Decision Feedback Equalizer (DFE) based receiver.

Figure 3:
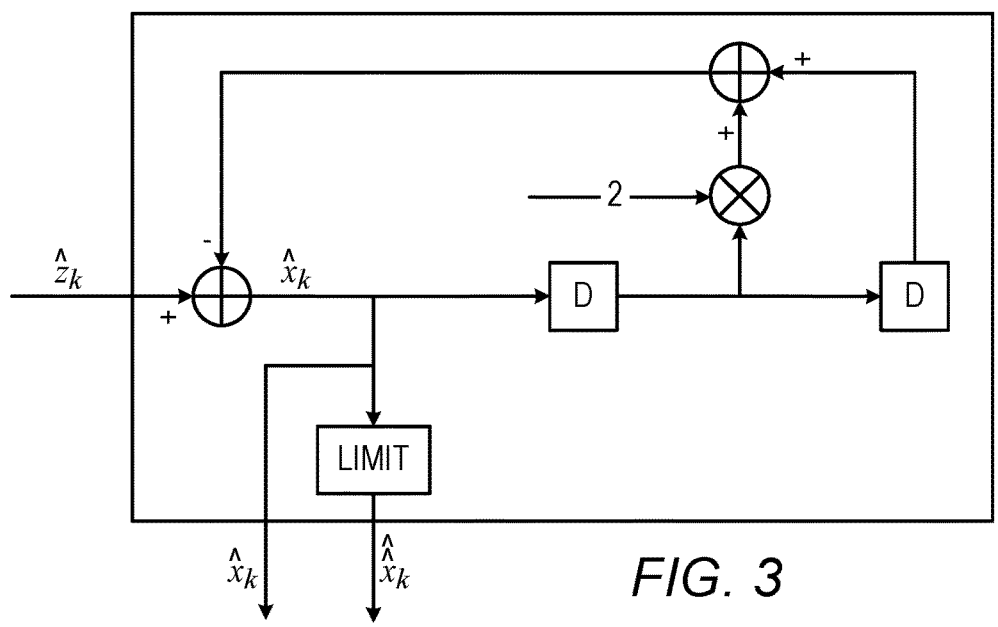
FIG. 3 is an exemplary illustration of a Decision Feedback Equalizer (DFE) for a class II Partial Response (PR2) channel, in accordance with the presently disclosed subject matter.
Figure 4:
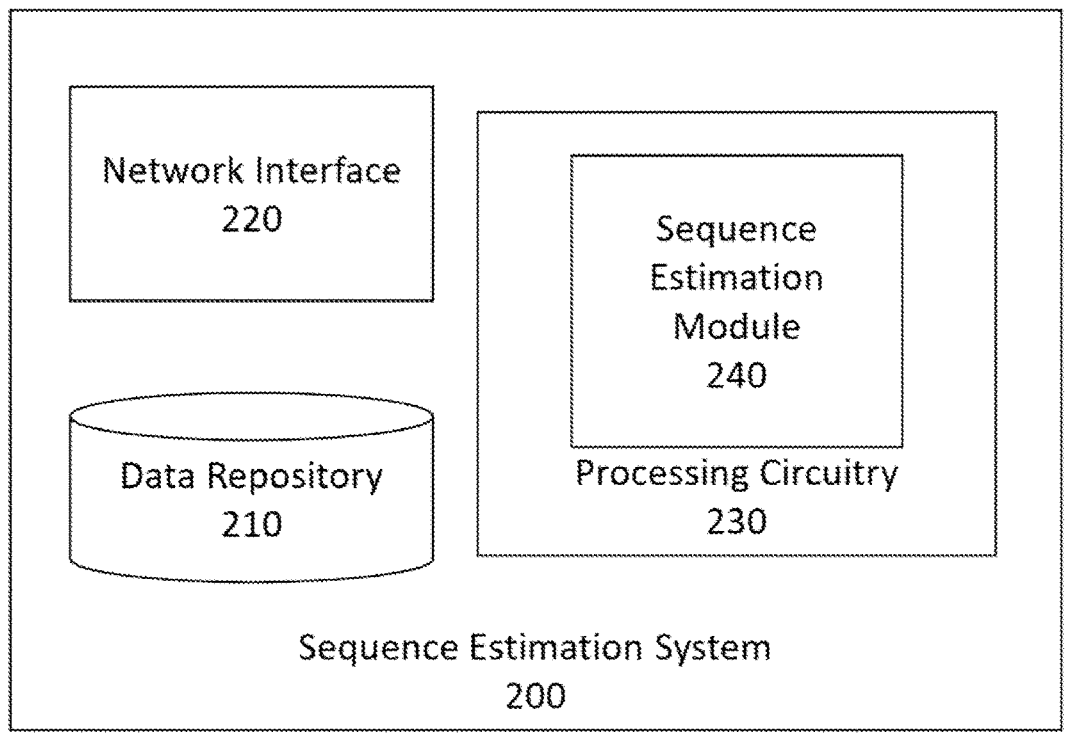
FIG. 4 is a block diagram of a sequence estimation system, in accordance with the presently disclosed subject matter.

FIG. 3 is an exemplary illustration of a Decision Feedback Equalizer (DFE) for a class II Partial Response (PR2) channel, in accordance with the presently disclosed subject matter.

The Decision Feedback Equalizer (DFE) depicted in FIG. 3 is an example of a non-linear equalizer which relies on decisions about the values of previous symbols to determine the current symbol. In our example, the DFE receives $\hat{z}_k$ (which denote the $k^{th}$ sample tentative estimation) as input, and estimates $\hat{x}_k$, The estimation is done by utilizing the two previous symbols $\hat{x}_k$ and $\hat{x}_k$ in the PR2 equation of: $\hat{x}_k = \hat{z}_k - 2\hat{x}_{k-1} - \hat{x}_{k-2}$. The DEE can optionally also output $\hat{\bar{x}}_k$ which corresponds to a limited value of $\hat{x}_k$.

FIG. 4 is a block diagram of a sequence estimation system, in accordance with the presently disclosed subject matter.

In accordance with some examples of the presently disclosed subject matter, sequence estimation system 200 comprises a network interface 220 (e.g., a network card, a WiFi client, a LiFi client, 3G/4G client, or any other component), enabling sequence estimation system 200 to communicate over a network with external systems such as transmitters from which it receives data and optionally to which it transmits data.

Sequence estimation system 200 further comprises, or is otherwise associated with, a data repository 210 (e.g., a database, a storage system, a memory including Read Only Memory—ROM, Random Access Memory—RAM, or any other type of memory, etc.) configured to store data, optionally including, inter alia, buffered sequences of received symbols, thresholds for identifying saturation, error hypotheses, various indexes, etc. Data repository 210 can be further configured to enable retrieval and/or update and/or deletion of the stored data. It is to be noted that in some cases, data repository 210 can be distributed, while the sequence estimation system 200 has access to the information stored thereon, e.g., via a wired or wireless network to which sequence estimation system 200 is able to connect (e.g. utilizing its network interface 220).

Sequence estimation system 200 further comprises a processing circuitry 230. Processing circuitry 230 can be one or more processing units (e.g., central processing units), microprocessors, microcontrollers (e.g., microcontroller units (MCUs)) or any other computing devices or modules, including multiple and/or parallel and/or distributed processing units, which are adapted to independently or cooperatively process data for controlling relevant sequence estimation system 200 resources and for enabling operations related to sequence estimation system's 200 resources.

Processing circuitry 230 can comprise a sequence estimation module 240. Sequence estimation module 240, can be configured to estimate an input sequence ($\hat{x}_0$, $\hat{x}_1$, $\hat{x}_2$, . . . ), which is an estimation of an input sequence ($x_0$, $x_1$, $x_2$, . . . ) transmitted thereto by a transmitter as further detailed herein, inter alia with reference to FIGS. 1-3 and 5-10.

Figure 5:
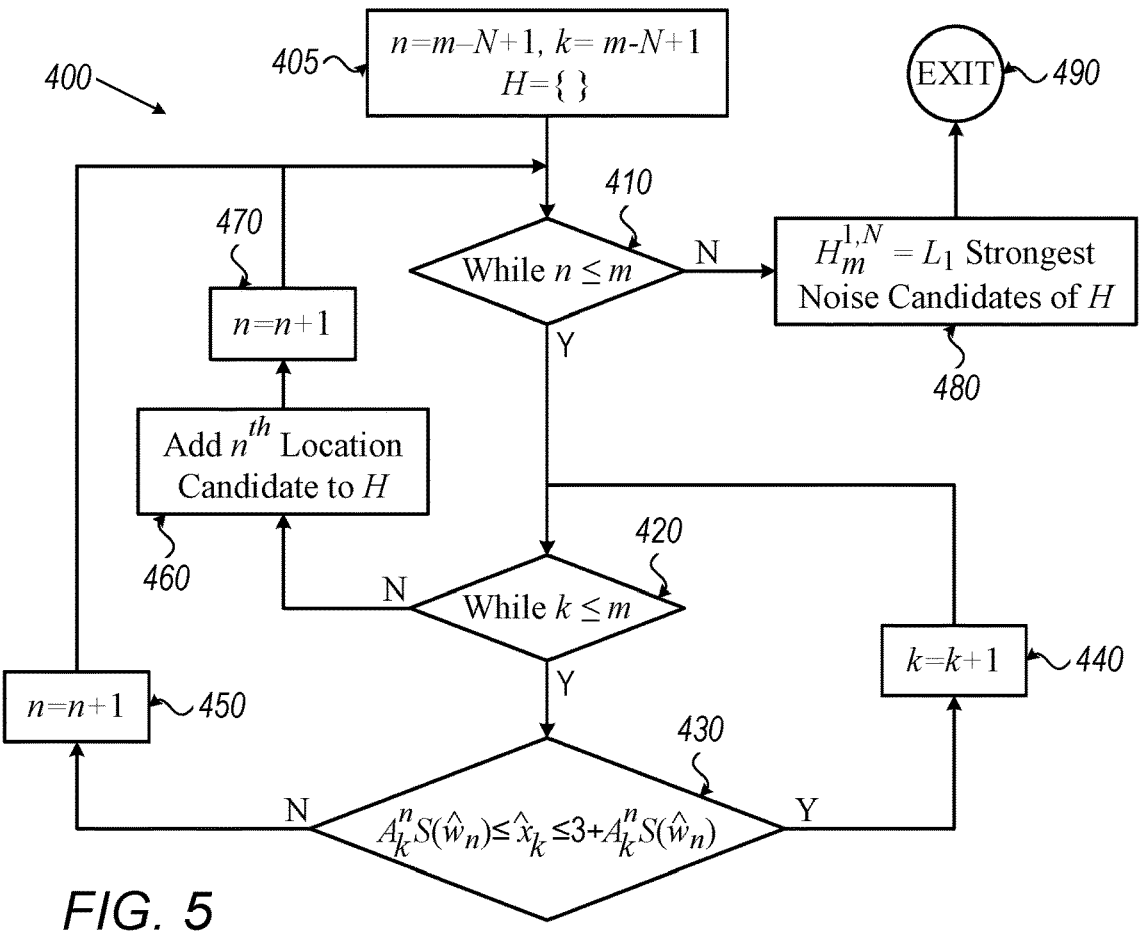
FIG. 5 is a flowchart illustrating one example of a sequence of operations carried out for detecting a single error in an estimation of an input sequence, in accordance with the presently disclosed subject matter.

FIG. 5 is a flowchart illustrating one example of a sequence of operations carried out for detecting a single error in an estimation of an input sequence, in accordance with the presently disclosed subject matter.

Before turning to the single error detection process 400, attention is drawn to a calculation used to determine a pair of thresholds (also referred to herein as a symbol-associated low threshold and a symbol-associated high threshold) that are used therein in order to identify error hypotheses that are indicative of potential errors made in the estimation of the input sequence:

Let Q(•) denote a PR2 based level slicer (quantizer) decision operation on the received sequence $y_k$, and let $\hat{z}_k$ denote the $k^{th}$ sample tentative estimation, then $\hat{z}_k = Q(y_k)$. Ideally, without any estimation errors: $\hat{z}_k = x_k + 2x_{k-1} + x_{k-2}$.

For the received sequence $y_k$, and the tentative estimations $\hat{z}_k$, the estimated noise sequence denoted by $\hat{w}_k$ is equal to: $\hat{w}_k = y_k - \hat{z}_k$.

It is noted that $\hat{w}_k$ is just an estimate of the true noise, and without estimation errors $\hat{w}_k = y_k - \hat{z}_k = y_k - z_k = y_k - x_k - 2x_{k-1} - x_{k-2} = w_k$.

The sequence $\hat{w}_k$ and the estimated input sequence $\hat{x}_k$ can be used for detection and correction of the tentative estimation errors. It is assumed that the estimated input sequence symbols $\hat{x}_k$ are obtained from the output of the PR2 based DFE block shown in FIG. 3.

Based on the above, the estimated input sequence symbols $\hat{x}_k$ are given by $$\hat{x}_k = \hat{z}_k - 2\hat{x}_{k-1} - \hat{x}_{k-2}.$$

The final transmitted symbol decisions are denoted by $\hat{\hat{x}}_k$ and are obtained by limiting $\hat{x}_k$ to that same range. Tentative estimation error events can therefore be detected by considering the symbols $\hat{x}_k$. An error event (also referred to as a saturation) will be declared whenever $\hat{x}_k < 0$ or $\hat{x}_k \geq M$ (considering a PAM-M channel in which 0 is the minimal allowed value for $\hat{x}_k$ and M−1 is the maximal allowed value for $\hat{x}_k$), and in accordance with the presently disclosed subject matter it is desirable to find the location and the value of the tentative estimation error which have caused this saturation.

In accordance with the presently disclosed subject matter, a unique error pattern added to all subsequent estimated input sequence symbols with increasing amplitudes is utilized. This property means that there is a smaller likelihood for an error to keep circulating for long before causing a saturation event. The full structure of the error pattern can be used in order to enhance the detection and correction capability of the tentative decision errors. This is described next.

Let $A_k^n \equiv (-1)^{k-n+1}(k-n+1)$.

Since in PAM-M modulation $0 \leq x_k \leq M-1$, each tentative decision error candidate at location n should result in a DFE output sequence (the estimated input sequence $\hat{x}_k$) that satisfies the following: $A_k^n e_n \leq \hat{x}_k \leq M-1+A_k^n e_n$.

In this case, a location n tentative decision error candidate can be excluded if it was followed by some DFE output decision $\hat{x}_k$ which does not fall in the above boundary region. This validation process can be done sequentially on each of the error location candidates kept in a buffer before they are finally selected based on their corresponding estimated noise amplitudes. For simplicity of implementation, the fixed $A_k^n$ pattern sequence can be calculated and stored once at the beginning of the process. We also note that the sequence $e_n$ should be computed using the estimated noise values as follows:

$$\hat{e}_n = S(\hat{w}_k),$$

where S(•) denotes the sign operator. The underlying assumption here is that with very high probability the true error value $e_n$ is equal to +1 or −1.

Returning to the single error detection process 400, in accordance with the presently disclosed subject matter, sequence estimation system 200 can be configured to perform the single error detection process 400, e.g., using sequence estimation module 240.

It is assumed that a saturation error event was detected at position m, and the algorithm tries to select the top $L_1$ tentative decision error candidates from a fixed window positioned between m−N+1 and m. This type of operation is enabled by the rapid saturation event occurrence due to the growing error pattern amplitudes. Although the implementation can be done sequentially, the introduction of a window-based approach can have significant computational complexity advantage especially at high SNR (the region where the BER is, for example, below $10^{-4}$) where the saturation error events become sparse. The single error detection process 400 begins with an empty hypothesis set H, and only those hypotheses that pass the previously defined boundary region test for all subsequent k positions (n≤k<m) are added to H. The algorithm finally selects the hypothesis subset $H_m^{1,N}$, which includes the top $L_1$ candidates from the valid list of hypotheses H based on the estimated noise amplitudes.

Sequence estimation system 200 sets both n and k to be m−N+1 and sets H (the hypothesis set) to be an empty set (block 405). A check is made whether n≤m (block 410). If n≤m another check is made whether k≤m (block 420). If k≤m, another check is made whether ($A_k^n S(\hat{W}_n) \leq \hat{x}_k \leq 3 + A_k^n S(\hat{W}_n)$) while noting that in this example a PAM-4 channel is contemplated, and if another type of PAM channel was used, an appropriate integer will be used instead of 3 that is used in the PAM-4 channel example) (block 430). If the check is positive, k is increased by 1 (block 440) and the process returns to block 420. Otherwise, n is increased by 1 (block 450) and the process returns to block 410. If k>m at block 420, the $n^{th}$ location is added as a hypothesis to hypothesis set H (block 460), n is increased by 1 (block 470) and the process returns to block 410.

If n>m at block 410 a hypotheses subset $H_m^{1,N}$ which includes the top $L_1$ candidates from the valid list of hypotheses H is selected based on the estimated noise amplitudes, as further detailed herein (block 480) and the process ends (block 490).

Figure 6:
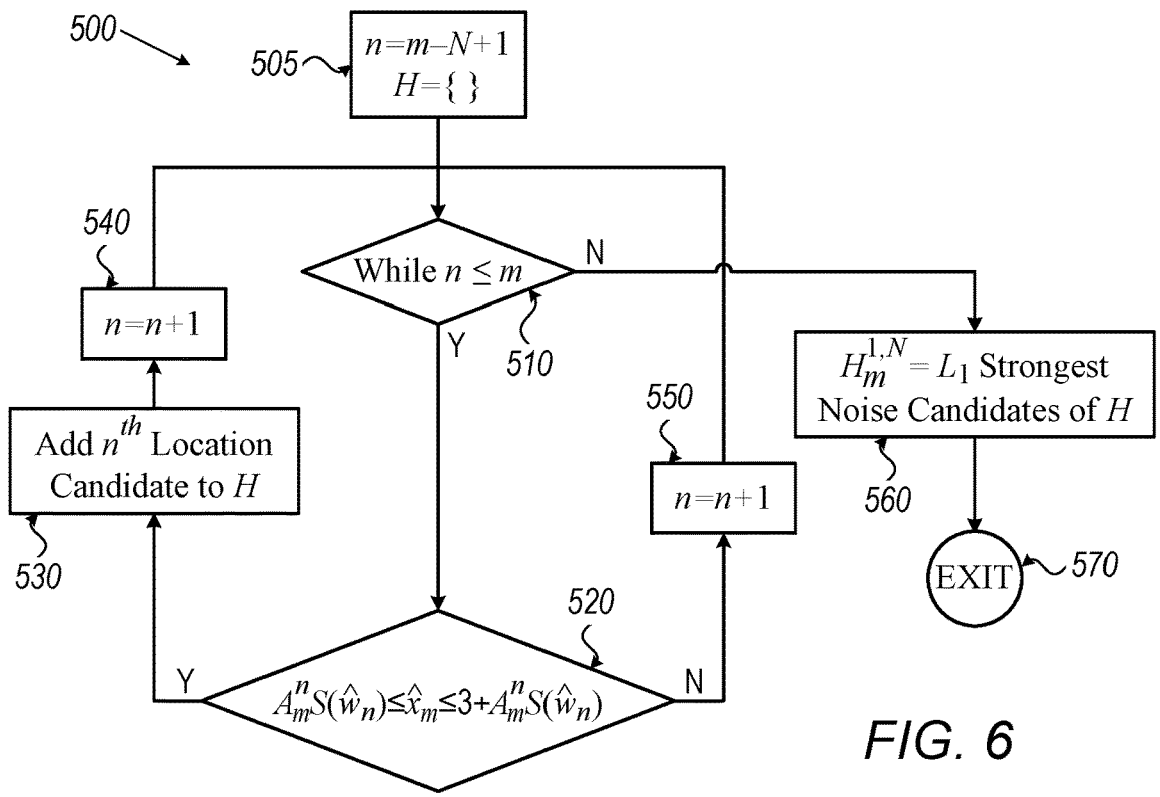
FIG. 6 is a flowchart illustrating another example of a sequence of operations carried out for detecting a single error in an estimation of an input sequence, in accordance with the presently disclosed subject matter.

It is to be noted that in this single error detection process 400, the complexity can be relatively high due to the number of tests required per window sample position, and a simplified version is provided herein with reference to FIG. 6.

It is to be still further noted that, with reference to FIG. 5, some of the blocks can be integrated into a consolidated block or can be broken down to a few blocks and/or other blocks may be added. Furthermore, in some cases, the blocks can be performed in a different order than described herein. It should be also noted that whilst the flow diagram is described also with reference to the system elements that realizes them, this is by no means binding, and the blocks can be performed by elements other than those described herein.

Attention is now drawn to FIG. 6, a flowchart illustrating another example of a sequence of operations carried out for detecting a single error in an estimation of an input sequence, in accordance with the presently disclosed subject matter.

In accordance with the presently disclosed subject matter, sequence estimation system 200 can be configured to perform a simplified single error detection process 500, e.g., using sequence estimation module 240.

For this purpose, sequence estimation system 200 can be configured to set n to be m−N+1 and H (the hypothesis set) to be an empty set (block 505). A check is made whether n≤m (block 510). If n≤m another check is made whether $A_m^n S(\hat{W}_n) \le \hat{x}_m \le 3 + A_m^n S(\hat{W}_n)$ (while noting that in this example a PAM-4 channel is contemplated, and if another type of PAM channel was used, an appropriate integer will be used instead of 3 that is used in the PAM-4 channel example) (block 520). If the check is positive, the $n^{th}$ location is added as a hypothesis to hypothesis set H (block 530), n is increased by 1 (block 540) and the process returns to block 510. Otherwise, n is increased by 1 (block 550) and the process returns to block 510. If n>m at block 510 a hypotheses subset $H_m^{1,N}$ which includes the top $L_1$ candidates from the valid list of hypotheses H is selected based on the estimated noise amplitudes, as further detailed herein (block 560) and the process ends (block 570).

In the simplified single error detection process 500, for each position n the test is performed once only at k=m. Based on performance results, this type of selection turns out to be sufficient for most cases and can be justified by the fact that the absolute value of the boundary region is maximum at the farthest location.

An example for the simplified single error detection process 500 results is provided in Table 1 below for n=8. As shown, based on the method disclosed on IEEE 802.3-2018, IEEE Standard for Ethernet, the values $(-1)^{7-n+1} \hat{e}_n$ (n=0, 1, . . . , 7, m=7) results in H={1, 3, 5, 6, 7}, and the final hypothesis selection based on the maximum noise amplitude would have been 7 instead of 6. In the proposed method, however, the hypotheses indices 1 and 7 are excluded by the boundary test. In this case, we get H={3, 5, 6}, and although the algorithm will generally keep more than one hypothesis in the final set $H_7^{1,8}$, the correct hypothesis would have been selected by the same noise amplitude selection criteria.

TABLE 1

| n | 0 | 1 | 2 | 3 | 4 | 5 | 6 | 7 |
|---|---|---|---|---|---|---|---|---|
| $y_n$ | 3.01 | 6.37 | 3.29 | 2.31 | 5.18 | 4.45 | 3.53 | 4.49 |
| $z_n$ | 3 | 6 | 3 | 2 | 5 | 4 | 3 | 4 |
| $\hat{z}_n$ | 3 | 6 | 3 | 2 | 5 | 4 | 4 | 4 |
| $\hat{w}_n$ | 0.01 | 0.37 | 0.29 | 0.31 | 0.18 | 0.45 | −0.47 | 0.49 |
| $x_n$ | 3 | 0 | 0 | 2 | 1 | 0 | 2 | 0 |
| $\hat{x}_n$ | 3 | 0 | 0 | 2 | 1 | 0 | 3 | −2 |
| $(-1)^{7-n+1} e_n$ | 1 | −1 | 1 | −1 | 1 | −1 | −1 | −1 |
| $A_7^n e_n$ | 8 | −7 | 6 | −5 | 4 | −3 | −2 | −1 |
| $3 + A_7^n e_n$ | 11 | −4 | 9 | −2 | 7 | 0 | 1 | 2 |

TABLE 1-continued

| n | 0 | 1 | 2 | 3 | 4 | 5 | 6 | 7 |
|---|---|---|---|---|---|---|---|---|
| Valid hyp-IEEE | 0 | 1 | 0 | 1 | 0 | 1 | 1 | 1 |
| Valid hyp-New | 0 | 0 | 0 | 1 | 0 | 1 | 1 | 0 |

It is to be noted with reference to FIG. 6 that some of the blocks can be integrated into a consolidated block or can be broken down to a few blocks and/or other blocks may be added. Furthermore, in some cases, the blocks can be performed in a different order than described herein. It should be also noted that whilst the flow diagram is described also with reference to the system elements that realizes them, this is by no means binding, and the blocks can be performed by elements other than those described herein.

Figure 7:
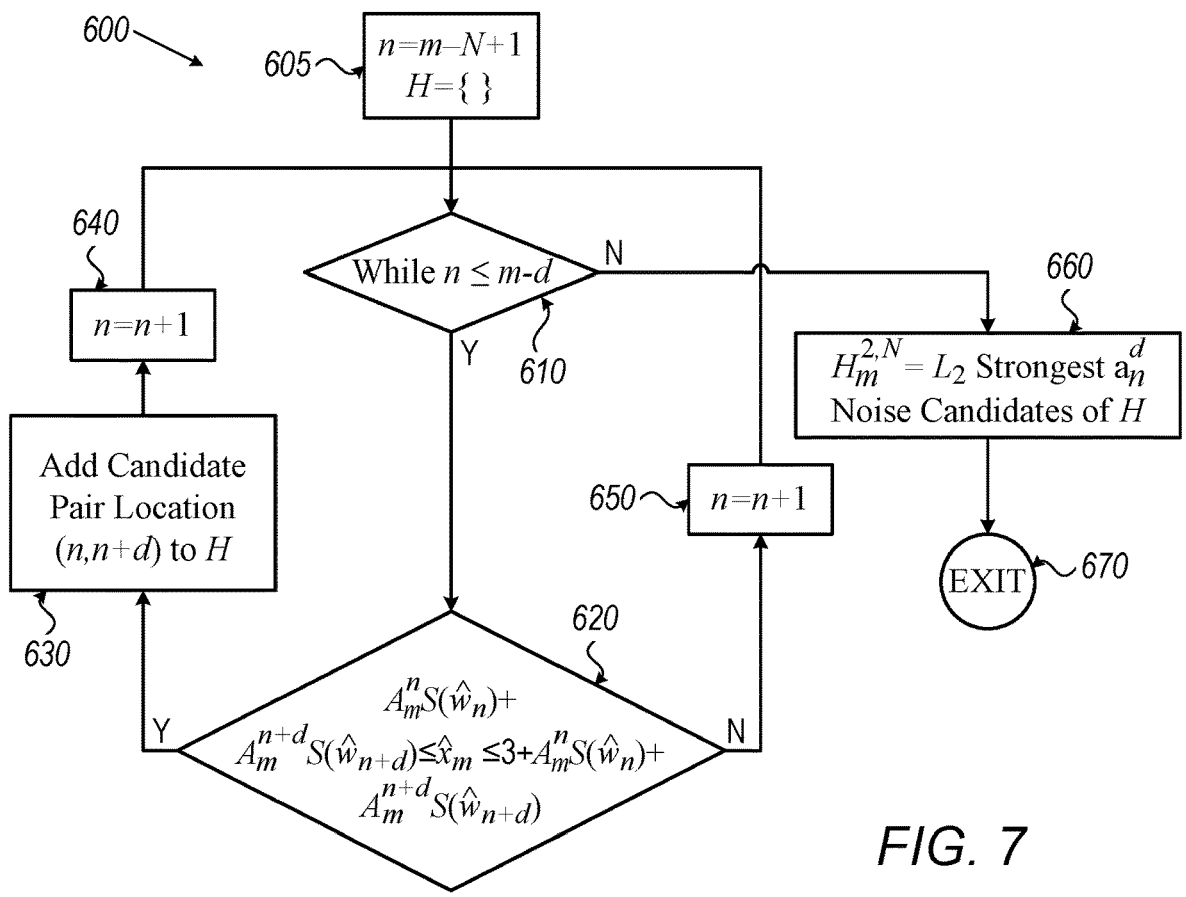
FIG. 7 is a flowchart illustrating one example of a sequence of operations carried out for detecting a double error in an estimation of an input sequence, in accordance with the presently disclosed subject matter.

FIG. 7 is a flowchart illustrating one example of a sequence of operations carried out for detecting a double error in an estimation of an input sequence, in accordance with the presently disclosed subject matter.

According to the presently disclosed subject matter, a pair of tentative decision errors can also be identified. In the PR1 channel case, the likelihood of two or more tentative decision errors occurring before a saturation event occurring at the DFE output was negligibly small and as a result it was not considered. However, in the PR2 channel scenario, this type of error is much more likely and to achieve very low Bit Error Rate (BER) performance its consideration is advantageous. In order to derive a double error detection process, it is to be noted that from linearity, the error patterns resulting from each of the tentative decision error locations will add up. Assuming n and p (p>n) as the two error locations, then starting from location p, the error pattern should be equal to $A_k^n e_n + A_k^p e_p$, and similar to the above we can now apply the boundary test:

$$A_k^n e_n + A_k^p e_p \le \hat{x}_k \le 3 + A_k^n e_n + A_k^p e_p, \forall k \ge p.$$

Using the above bounding method, and similar to the single error detection technique, the fixed sequence $A_k^n$ can be used together with the sign of the estimated noise sequence to test each of the hypotheses between m−N+1 and m. Since depending on the window size N, the search for all possible combinations of error pair locations can be highly complicated, the search can be limited only for those pairs which are located within a small distance d=p−n from each other. Selecting d=3 achieves the best possible performance Beyond this distance, the likelihood of saturation event not occurring before n+4 becomes small such that it can have a minimal impact on performance. Therefore, in the following description use of the above is made for error pairs having distances less or equal to three only. For clarity, we rewrite the above boundary test by replacing p with d as follows:

$$A_k^n e_n + A_k^{n+d} e_{n+d} \le \hat{x}_k \le 3 + A_k^n e_n + A_k^{n+d} e_{n+d}.$$

As mentioned, the above test should be applied for d=1, 2, 3 and k≥n+d.

In terms of the final top candidate selection method, the joint noise amplitude summation $a_n^d = |\hat{w}_n| + |\hat{w}_{n+d}|$ is considered, and the position (or positions) that maximizes it is selected. The algorithm version with the complete DFE output boundary testing can be similarly derived as above with reference to the single error detection processes. Herein reference will be made to the simplified algorithm which essentially yields performance results that are similar to the standard algorithm. In this case, as the test is applied only once (for k=m) per position candidate in the window segment.

As mentioned above, the final hypothesis selection requires candidate location ordering based on the $a_n^d$ sequence. This operation can be continuously performed sequentially, or on a segment-by-segment basis whenever a DFE output error event occurs. The latter approach should have significant benefit in terms of the average computational time complexity especially for medium-high SNR (the region where the BER is, for example, between $10^{-2}$ and $10^{-4}$) scenarios. In any case, however, the window size N should be kept sufficiently large to capture the tentative estimation error locations with high probability. On the other hand, for low SNR (the region where the BER is, for example, above $10^{-2}$), the windows of consecutive error events may overlap and depending on the frequency of such events, the continuous approach may provide some advantage. The details of the full sequence estimation algorithm are provided herein inter alia with reference to FIG. 8.

Before turning to the input sequence estimation process 700 detailed with reference to FIG. 8, attention is drawn back to the simplified double error detection process 600. In accordance with the presently disclosed subject matter, sequence estimation system 200 can be configured to perform a simplified double error detection process 600, e.g., using sequence estimation module 240.

For this purpose, sequence estimation system 200 can be configured to set n to be m−N+1 and H (the hypothesis set) to be an empty set (block 605). A check is made whether n≤m−d (block 610). If n≤m−d another check is made whether $A_m^n S(\hat{W}_n) + A_m^{n+d} S(\hat{W}_{n+d}) \leq \hat{x}_m \leq 3 + A_m^n S(\hat{W}_n) + A_m^{n+d} S(\hat{W}_{n+d})$ (while noting that in this example a PAM-4 channel is contemplated, and if another type of PAM channel was used, an appropriate integer will be used instead of 3 that is used in the PAM-4 channel example) (block 620). If the check is positive, the ($n^{th}$, $n+d^{th}$) location is added as a hypothesis to hypothesis set H (block 630), n is increased by 1 (block 640) and the process returns to block 610. Otherwise, n is increased by 1 (block 650) and the process returns to block 610. If n>m−d at block 610 a hypotheses subset $H_m^{1,N}$ which includes the top $L_1$ candidates from the valid list of hypotheses H is selected based on the estimated noise amplitudes, as further detailed herein (block 660) and the process ends (block 670).

It is to be noted with reference to FIG. 7 that some of the blocks can be integrated into a consolidated block or can be broken down to a few blocks and/or other blocks may be added. Furthermore, in some cases, the blocks can be performed in a different order than described herein. It should be also noted that whilst the flow diagram is described also with reference to the system elements that realizes them, this is by no means binding, and the blocks can be performed by elements other than those described herein.

Figure 8:
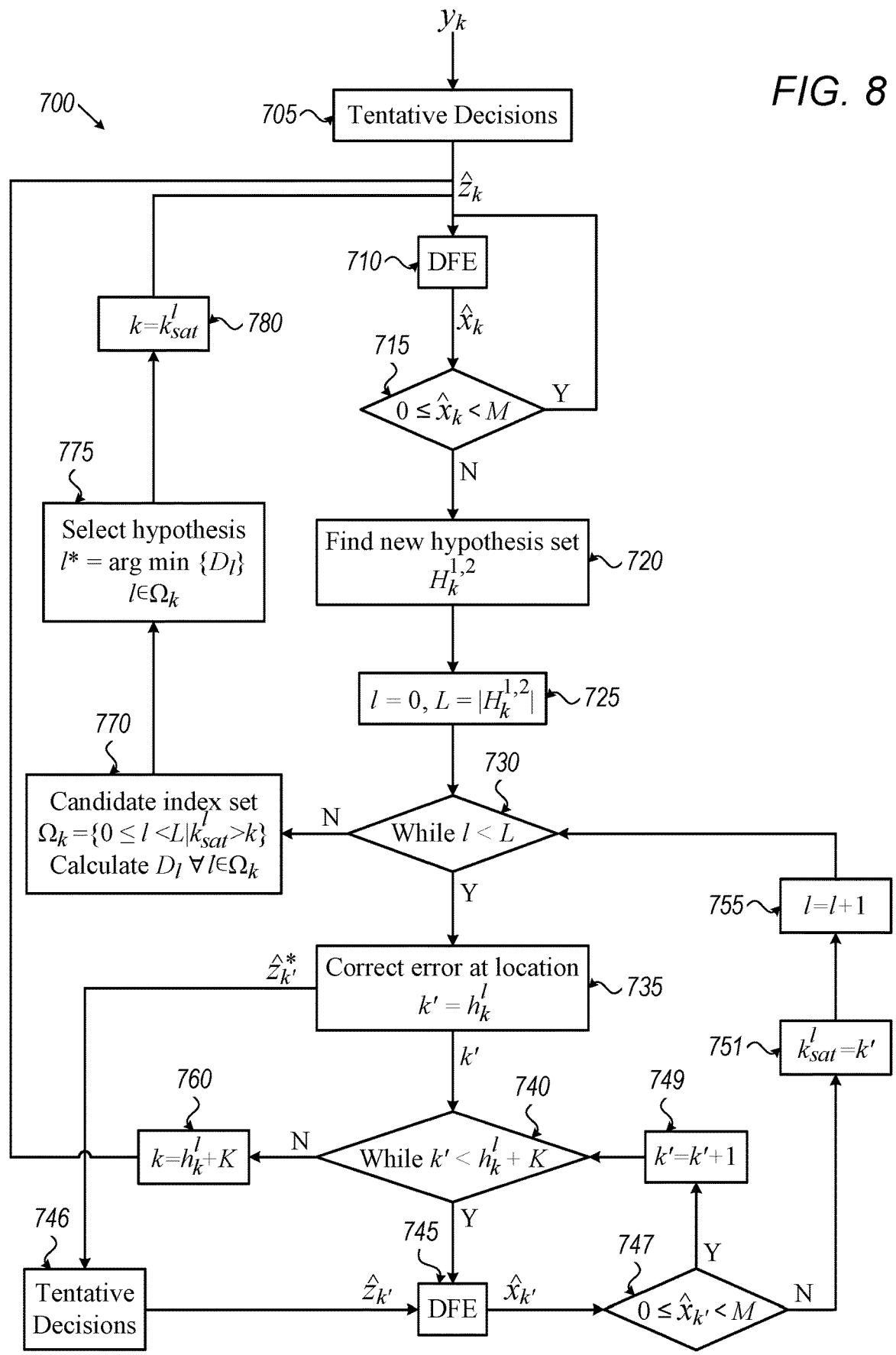
FIG. 8 is a flowchart illustrating one example of a sequence of operations carried out for estimating an input sequence, in accordance with the presently disclosed subject matter.

Turning to FIG. 8, there is shown a flowchart illustrating one example of a sequence of operations carried out for estimating an input sequence, in accordance with the presently disclosed subject matter.

In accordance with the presently disclosed subject matter, the input sequence estimation can rely on the simplified single error detection process 500 and on the simplified double error detection process 600 described herein with reference to FIGS. 6 and 7 (while noting that as an alternative, other algorithms can be used, such as the single error detection process 400 or any other process that generates a list of hypotheses indicative of potential estimation errors, mutatis mutandis).

When relying on the simplified single error detection process 500 and on the simplified double error detection process 600, for near MLSE performance, the false error estimation probability needs to be very low (for example below $10^{-4}$). For this reason, we select L1 and L2 number of hypotheses to remain in the two sets $H_m^{1,N}$ and $H_m^{2,N}$ until the final hypothesis is selected. The distance of the location of a subsequent saturation error event from the location of the last corrected tentative estimation error can be used as a measure of confidence for choosing the final hypothesis. For this purpose, the following biased metric calculation method can be used. It is to be noted that this stage can be skipped when the distance of the subsequent saturation error event is greater than a fixed number for one of the hypotheses in $H_m^{1,N}$ or $H_m^{2,N}$.

The input sequence estimation process 700 described herein relies on a distance metric calculation stage which can be performed when an additional saturation event occurs within a fixed window following a last tentative estimated error correction attempt. In this case, the last error estimation correction (correcting an estimated error) may have caused the subsequent saturation due to false error estimation, or it could be independent as a result of a new tentative error estimation. Using the received samples $y_k$ and the DFE output sequence $\hat{x}_k$, the following distance metric calculation method can be used: $d_k = (y_k - \hat{x}_k - 2\hat{x}_{k-1} - \hat{x}_{k-2})^2 - b$ where b denotes a fixed bias parameter. More weights can be provided to hypotheses which defer subsequent saturation error events longer.

Let $H_m^{1,2} \equiv \{H_m^{1,N}, H_m^{2,N}\}$ denote the combined set of hypotheses, and for each hypothesis $h_m^l \in H_m^{1,2}$, let $k_{sat}^l$ denote the location of the first saturation event occurring after a tentative decision error correction at location $h_m^l$. For each hypothesis, the following accumulated metric needs to be calculated:

$$D_l = \sum_{k=h_m^l}^{k_{sat}^l-1} d_k = \sum_{k=h_m^l}^{k_{sat}^l-1} \left(y_k - \hat{x}_k - 2\hat{x}_{k-1} - \hat{x}_{k-2}\right)^2 - (k_{sat}^l - h_m^l)b.$$

In this case, $(k_{sat}^l - h_m^l)b$ as value added to each hypothesis. This can be made in order to provide more weights to hypotheses that cause smaller amounts of saturations, or conversely, give more weights to those which extend the number of symbols until a subsequent saturation event. It is to be noted that the bias parameter value can be fine-tuned based on simulations, and as a rule of thumb it can initially be set to $\sqrt{E|y-\hat{z}_n|^2}$.

In accordance with the presently disclosed subject matter, sequence estimation system 200 can be configured to perform an input sequence estimation process 700, e.g., using sequence estimation module 240.

For this purpose, sequence estimation system 200 receives the received sequence (denoted $y_k$), and determines tentative estimations (denoted $\hat{x}_k$), using a PR2 based level slicer (quantizer) decision operation on the received sequence $y_k$ (block 705). The tentative estimations are then input to the DFE which in turn computes the two output sequences $\hat{x}_k$ and $\hat{\hat{x}}_k$ (block 710). As previously mentioned, the symbols $\hat{x}_k$ are the final decisions, and as long as the sequence $\hat{x}_k$ meets the condition $0 \leq \hat{x}_k < M$, indicating that no saturation events occurred (block 715), the process continues performing only those slicer-DFE operations.

When a saturation error event does occur at some time location k, the single and double error detection processes described in FIG. 6 and FIG. 7 (or any other single/double error detection algorithms) are executed and the resulting sets of hypotheses $H_k^{1,N}$ and $H_k^{2,N}$ are then saved in a single set denoted by $H_k^{1,2}$ (block 720). l is set to zero and L is set to be the number of hypotheses in $H_k^{1,2}$ (block 725). A check is made whether l<L (block 730). If in the affirmative, the assumed error at location $k'=h_k^l$ is corrected (block 735). A check is made whether $k'<h_k^l+K$ (block 740) and if so, tentative estimations (denoted $\hat{z}_k$) that are determined, using a PR2 based level slicer (quantizer) decision operation on the received sequence $y_k$ following the correction of the assumed error at location k' (block 765) are input to the DFE (block 745). A check is made whether $\hat{x}_k$ as determined by the DFE is saturated or not (noting that it is saturated when $\hat{x}_k$ is lower than 0 or higher than M, the type of PAM-M channel) (block 747). If it is not saturated k' is increased by 1 (block 749) and the process returns to block 740. If it is saturated, $k_{sat}^l$ is assigned with the value of k' (block 751), l is increased by 1 (block 755), and the process returns to block 730.

If k' is not smaller than $h_k^l+K$ at block 740, thank is updated to be $h_k^l+K$ (block 760) and the process returns to block 710.

When l is no longer smaller than L at block 730, the set $\Omega_k$ is defined to hold all the valid hypothesis indices based on the above saturation test as follows $\Omega_k = \{0 \leq l \leq L | k_{sat}^l > k\}$, where $L = |H_k^{1,2}|$ is the combined set cardinality (block 770). The final hypothesis is selected by $$l^* = \operatorname*{argmin}_{l \in \Omega_k} \{D_l\}$$

(block 775), k is set to $k_{sat}^{l^*}$ (block 780) and the process returns to block 710.

It is to be noted, as indicated herein, that a saturation error event occurring after a tentative decision error correction may be a result of two different causes which are normally hard to identify. However, when this saturation event occurs before or at the previous saturation event that triggered the input sequence estimation process 700, then in most cases it will indicate that the selected hypothesis error correction operation could not resolve the error that caused the original saturation event and therefore this hypothesis will be declared as invalid.

It is to be noted with reference to FIG. 8 that some of the blocks can be integrated into a consolidated block or can be broken down to a few blocks and/or other blocks may be added. Furthermore, in some cases, the blocks can be performed in a different order than described herein. It should be also noted that whilst the flow diagram is described also with reference to the system elements that realizes them, this is by no means binding, and the blocks can be performed by elements other than those described herein.

Figure 9:
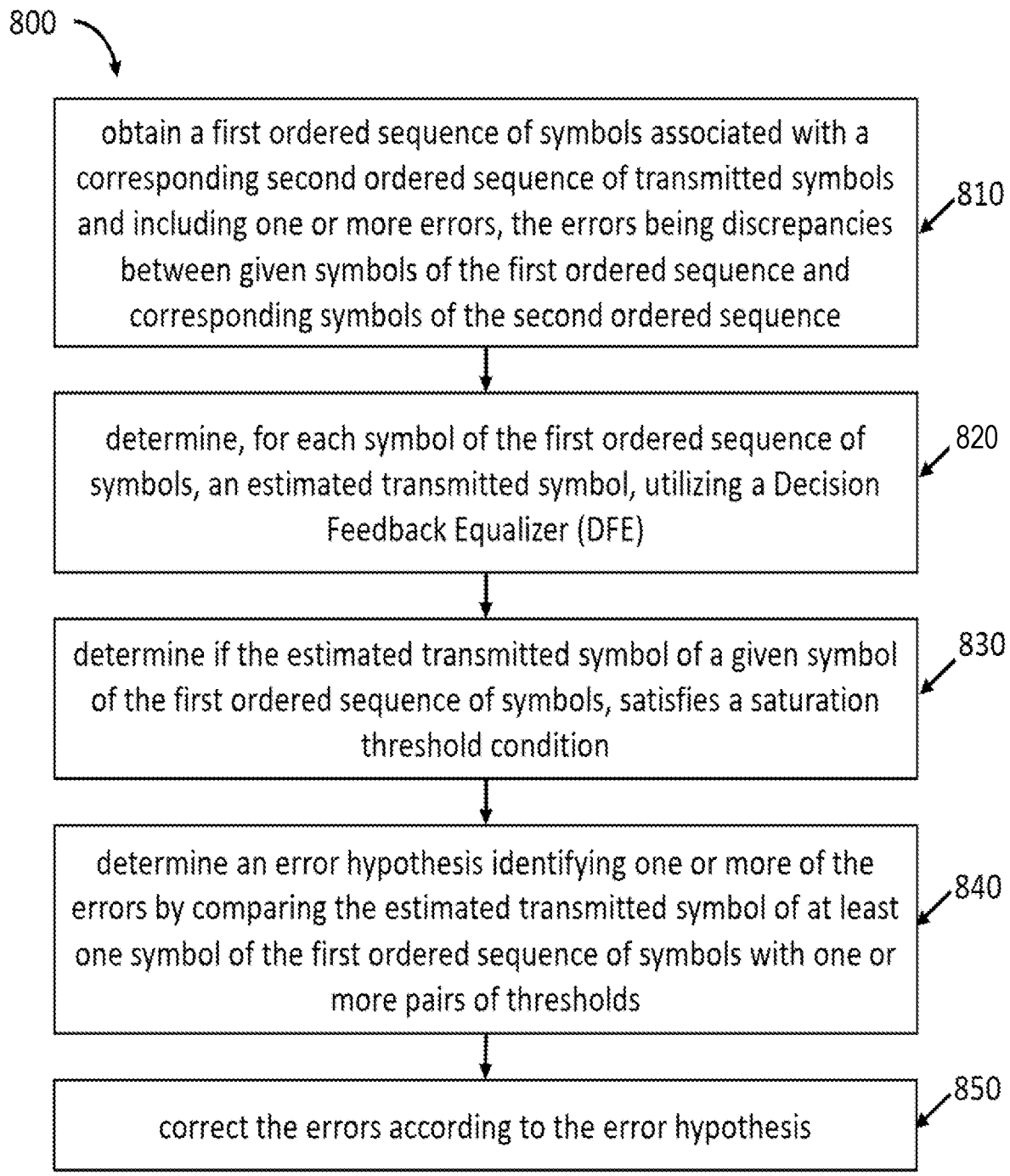
FIG. 9 is a flowchart illustrating another example of a sequence of operations carried out for estimating an input sequence, in accordance with the presently disclosed subject matter.

Attention is now drawn to FIG. 9, a flowchart illustrating another example of a sequence of operations carried out for estimating an input sequence, in accordance with the presently disclosed subject matter.

In accordance with the presently disclosed subject matter, sequence estimation system 200 can be configured to perform an input sequence estimation process 800, e.g., using sequence estimation module 240.

For this purpose, sequence estimation system 200 can be configured to obtain a first ordered sequence of symbols (denoted r(t) in FIG. 1) associated with a corresponding second ordered sequence of transmitted symbols (being the input sequence in FIG. 1—$x_0, x_1, x_2, \ldots$) and including one or more errors, the errors being discrepancies between given symbols of the first ordered sequence and corresponding symbols of the second ordered sequence (block 810). The first ordered sequence of symbols can be obtained directly from the transmitter, such as the transmitter of FIG. 1, or another transmitter, via a wired or wireless connection (e.g. utilizing the network interface 220). Alternatively, it can be obtained indirectly, via an intermediate entity.

It is to be noted that in some cases, the first ordered sequence of symbols is obtained by filtering and quantizing (e.g. using a slicer) a received signal (denoted r(t) in FIG. 1) comprising the second ordered sequence of transmitted symbols transmitted via a channel. In some cases, the channel adds noise to a transmitted signal (denoted s(t) in FIG. 1), to obtain the received signal. The received signal can be an M-array Pulse-Amplitude Modulation (PAM-M) modulated signal, and it can behave like a class II Partial Response (PR2) channel signal, being a signal that passed through a PR2 channel.

It is to be further noted that the filtering of the received signal can be performed using an equalizer filter, that can be an analog equalizer filter, a digital equalizer filter, or a combination thereof. The equalizer filter can be a three-tap class Partial Response (PR) channel-based equalizer. In some cases, the three-tap class PR channel-based equalizer is a class II Partial Response (PR2) channel-based equalizer.

Sequence estimation system 200 can be further configured to determine, for each symbol of the first ordered sequence of symbols obtained at block 810, an estimated transmitted symbol, utilizing a Decision Feedback Equalizer (DFE), such as the DFE, of FIG. 3 (however not thus limited) (block 820). The estimated transmitted symbols estimated at block 820 form an estimated input sequence ($\hat{x}_0, \hat{x}_1, \hat{x}_2, \ldots$), which is an estimation of an input sequence ($x_0, x_1, x_2, \ldots$) transmitted by the transmitter such as the transmitter of FIG. 1. In some cases, the DFE is a three-tap class Partial Response (PR) channel-based equalizer. In some cases, the three-tap class PR channel-based equalizer is a class II Partial Response (PR2) channel-based equalizer.

Sequence estimation system 200 then determines if the estimated transmitted symbol of a given symbol $\hat{x}_k$ of the first ordered sequence of symbols (k being an integer index indicative of the location of the given symbol within the first ordered sequence of symbols), satisfies a saturation threshold condition (block 830). The saturation threshold condition is that the given symbol is below a low threshold or above an upper threshold. The upper threshold and the low threshold are associated with a modulation of the received signal comprising the second ordered sequence of transmitted symbols transmitted via a channel. It is to be noted in this respect that reference is made herein to a PAM-M channel in which 0 is the low threshold, being the minimal allowed value for $\hat{x}_k$ and M−1 is the upper threshold, being the maximal allowed value for $\hat{x}_k$ (k being an integer index), and thus, the saturation threshold condition is met when $\hat{x}_k < 0$ or $\hat{x}_k \geq M$ (so that upon the threshold condition being met—a saturation event is identified).

Sequence estimation system 200 determines an error hypothesis identifying one or more of the errors by comparing the estimated transmitted symbol of at least one symbol of the first ordered sequence of symbols with one or more pairs of thresholds (block 840). This can be performed upon identifying that the given symbol $\hat{x}_k$ satisfied the saturation threshold condition at block 830. One example for a process for determining the error hypothesis (including determination of the one or more pairs of thresholds) is provided herein, inter alia with reference to FIG. 10.

Sequence estimation system 200 is further configured to correct the errors according to the error hypothesis determined at block 840 (block 850).

It is to be noted with reference to FIG. 9 that some of the blocks can be integrated into a consolidated block or can be broken down to a few blocks and/or other blocks may be added. Furthermore, in some cases, the blocks can be performed in a different order than described herein. It should be also noted that whilst the flow diagram is described also with reference to the system elements that realizes them, this is by no means binding, and the blocks can be performed by elements other than those described herein.

FIG. 10 is a flowchart illustrating one example of a sequence of operations carried out for selecting an error hypothesis, in accordance with the presently disclosed subject matter.

In accordance with the presently disclosed subject matter, sequence estimation system 200 can be configured to perform an error hypothesis selection process 900, e.g., using sequence estimation module 240. In some cases, the error hypothesis that is determined at block 840 is the error hypothesis that is selected in accordance with the error hypothesis selection process 900 detailed herein.

For this purpose, sequence estimation system 200 is configured to calculate the one or more pairs of thresholds of block 840, for each symbol within a symbols window comprised of the given symbol $\hat{x}_k$ of block 830, and a predetermined number of symbols preceding the given symbol in the first ordered sequence of symbols, wherein each pair is comprised of: (i) a symbol-associated low threshold, and (ii) a symbol-associated high threshold (block 910).

In some cases, the symbol-associated low threshold and the symbol-associated high threshold can be associated with a modulation of the received signal (denoted r(t) in FIG. 1). In some cases, each pair of the one or more pairs of thresholds is associated with a location of the given symbol in the symbol window and with an assumed location of the one or more errors in the symbol window.

It is to be noted that the symbol-associated low threshold and the symbol-associated high threshold can be calculated also based on an assumed number of errors within the symbols of the symbols window (e.g. assumed single error, assumed double error, etc.). In a specific example, if the assumed number of errors is one (a single error):

(a) the symbol-associated low threshold equals $A_k^n e_n$;
(b) the symbol-associated upper threshold equals $M+A_k^n e_n$;
(c) $e_n$ is a sign operator of estimated noise added to the second ordered sequence of transmitted symbols before quantization which gave rise to the first ordered sequence of transmitted symbols;
(d) $A_k^n \equiv (-1)^{k-n+1}(k-n+1)$;
(e) n is a location of error within the symbols window;
(f) k is a running index within the symbols window; and
(g) M is a maximal value of the symbols (determined based on the modulation of the received signal—which is a PAM-M based modulated signal).

In another example, if the assumed number of errors is two (a double error):

(a) the symbol-associated low threshold equals $A_k^n e_n + A_k^p e_p$;
(b) the symbol-associated upper threshold equals $M+A_k^n e_n + A_k^p e_p$;
(c) $e_n$ is a sign operator of estimated noise added to the second ordered sequence of transmitted symbols before quantization which gave rise to the first ordered sequence of transmitted symbols;
(d) $A_k^n \equiv (-1)^{k-n+1}(k-n+1)$;
(e) n is a location of a first error within the symbols window;
(f) p is a location of a second error within the symbols window, succeeding the location of the first error;
(g) k is a running index within the symbols window; and
(h) M is a maximal value of the symbols (determined based on the modulation of the received signal—which is a PAM-M based modulated signal).

In some cases, p=n+d, where d is an integer representing the distance between the location of the first error and the location of the second error within the symbols window.

Sequence estimation system 200 can be further configured to characterize each symbol of the symbols window as potentially erroneous upon the estimated transmitted symbol of the given symbol being below the symbol-associated low threshold of the respective symbol or above the symbol-associated high threshold of the respective symbol, which gives rise to characterization results (block 920). Symbols that are below the symbol-associated low threshold or above the symbol-associated high threshold form basis for hypotheses that are indicative of potential errors made in the estimations forming the estimated input sequence.

Sequence estimation system 200 can select the error hypothesis (that is determined at block 840) from one or more hypotheses determined utilizing the characterization results (block 930). It is to be noted that the hypotheses can include one or more single error hypotheses and/or one or more double error hypotheses that can be determined, for example, as detailed herein inter alia with reference to FIGS. 6 and 7.

The selection of the error hypothesis can be made by testing the hypotheses in a given order until reaching the error hypothesis that meets a condition. In some cases, the condition is that upon correcting errors in accordance with the error hypothesis, the estimated transmitted symbol determined for a given number of symbols of the first ordered sequence of symbols, immediately following a first symbol of the symbols window corrected in accordance with the error hypothesis, is not above the upper threshold or below the low threshold. In some cases, the given order is a descending order of an amplitude of a difference between the symbols of the first ordered sequence of symbols that are associated with the hypotheses, and the respective estimated transmitted symbols.

It is to be noted that upon none of the error hypotheses meeting the condition, the selection of the error hypothesis can be made so that upon correcting errors in accordance with the error hypothesis, a location of the estimated transmitted symbol determined for the given number of symbols of the first ordered sequence of symbols, immediately following the first symbol, that is above the upper threshold or below the low threshold, is farthest from the first symbol.

It is to be noted with reference to FIG. 10 that some of the blocks can be integrated into a consolidated block or can be broken down to a few blocks and/or other blocks may be added. Furthermore, in some cases, the blocks can be performed in a different order than described herein. It should be also noted that whilst the flow diagram is described also with reference to the system elements that realizes them, this is by no means binding, and the blocks can be performed by elements other than those described herein.

In the following figures (FIGS. 11-15) simulation results for the above proposed sequence estimation algorithms are provided. In general, the performance is compared against the optimal MLSE and the standard DFE, detection schemes. When it is relevant, results for a system employing PR1 based equalization followed by Viterbi MLSE are provided. For the proposed algorithms, an average time computational complexity analysis of the essential operations is also provided. In the following table, a summary of the design parameter values used throughout the simulations is provided:

| Parameter Name | Value | Parameter Description |
|---|---|---|
| N | 20 | Hypothesis detection window length |
| K | 24 | Forward sample processing length |
| P | 2 | Number of most recent saturation events |
| b | 0.12 | Metric bias |
| T | 5σ | Metric error detection threshold |
| $L_1$ | 3 | Number of single error hypotheses |
| $L_2^1$ | 1 or 2 | Number of two error hypotheses w/ d = 1 |
| $L_2^2$ | 1 or 2 | Number of two error hypotheses w/ d = 2 |
| $L_2^3$ | 1 or 2 | Number of two error hypotheses w/ d = 3 |

Figure 11:
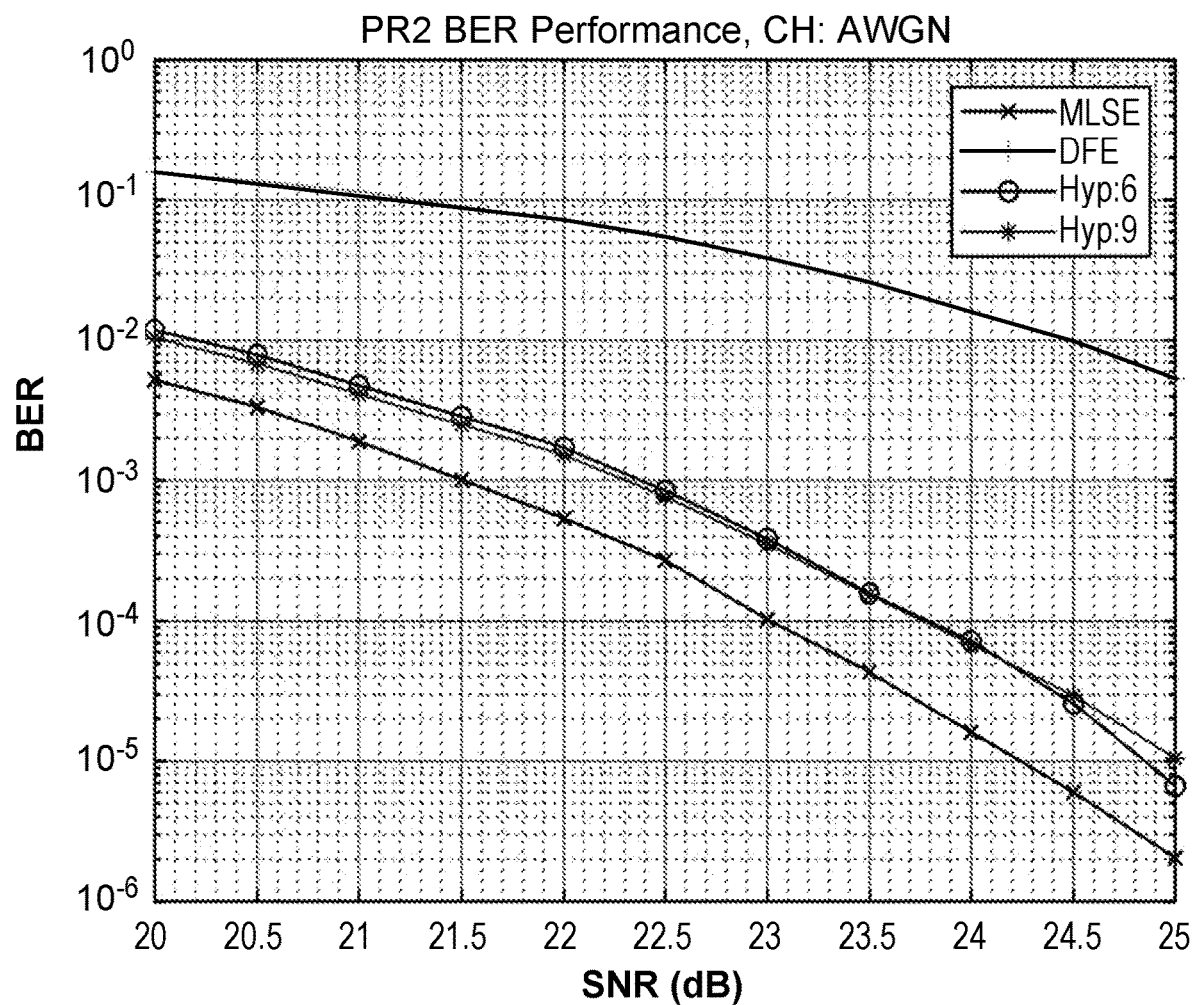
FIG. 11 is an exemplary illustration of Bit Error Rate (BER) comparison for an Additive White Gaussian Noise (AWGN) channel, in accordance with the presently disclosed subject matter.

FIG. 11 is an exemplary illustration of Bit Error Rate (BER) comparison for an Additive White Gaussian Noise (AWGN) channel, in accordance with the presently disclosed subject matter.

Results are included for $L_1=3$ and $L_2^d=1$ or 2 (d=1, 2, 3). As it can be seen, the loss compared to MLSE is close to 0.7 dB for BER equal to $10^{-4}$.

Figure 12:
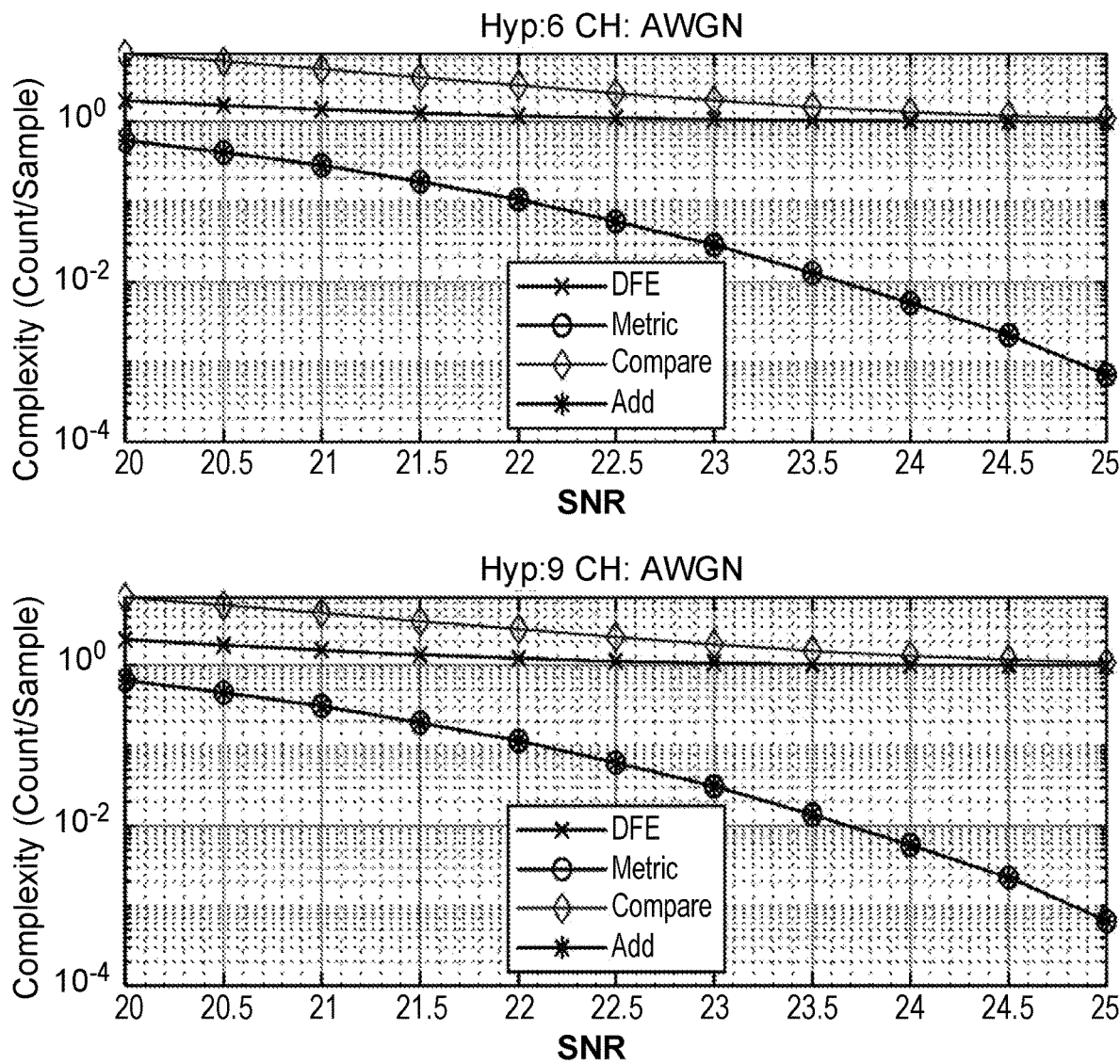
FIG. 12 is an exemplary illustration of an average time complexity analysis for an Additive White Gaussian Noise (AWGN) channel, in accordance with the presently disclosed subject matter.

FIG. 12 is an exemplary illustration of an average time complexity analysis for an Additive White Gaussian Noise (AWGN) channel, in accordance with the presently disclosed subject matter.

In terms of computational complexity, in FIG. 11 we can see the average time complexity analysis for the essential operations. For each of the two cases shown, we show the average number of operations per sample for the DFE, metric, compare, and add operations. As it can be seen, when the SNR is high (the region where the BER is, for example, below $10^{-4}$), all algorithm configurations are mainly performing one DFE operation on average per sample (all other operations are performed at a much lower frequency). However, for lower SNR levels such as at 23 dB where the BER is close to $10^{-4}$ (target BER defined in the 802.3 standard), we can see the complexity is still relatively low in all configurations.

Figure 13:
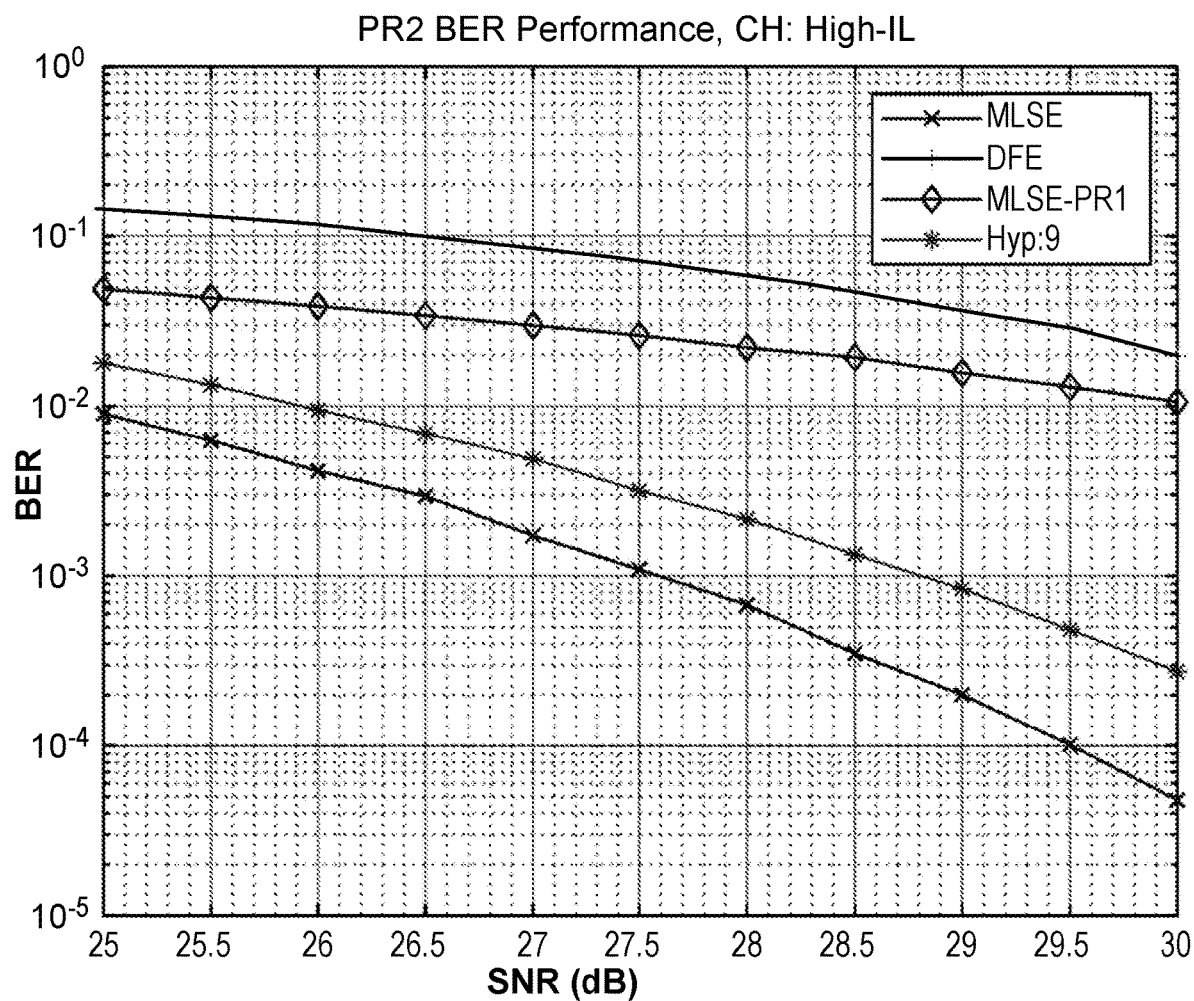
FIG. 13 is an exemplary illustration of Bit Error Rate (BER) comparison for a channel with a high Insertion Loss (IL), in accordance with the presently disclosed subject matter.

FIG. 13 is an exemplary illustration of Bit Error Rate (BER) comparison for a channel with a high Insertion Loss (IL), in accordance with the presently disclosed subject matter.

Figure 15:
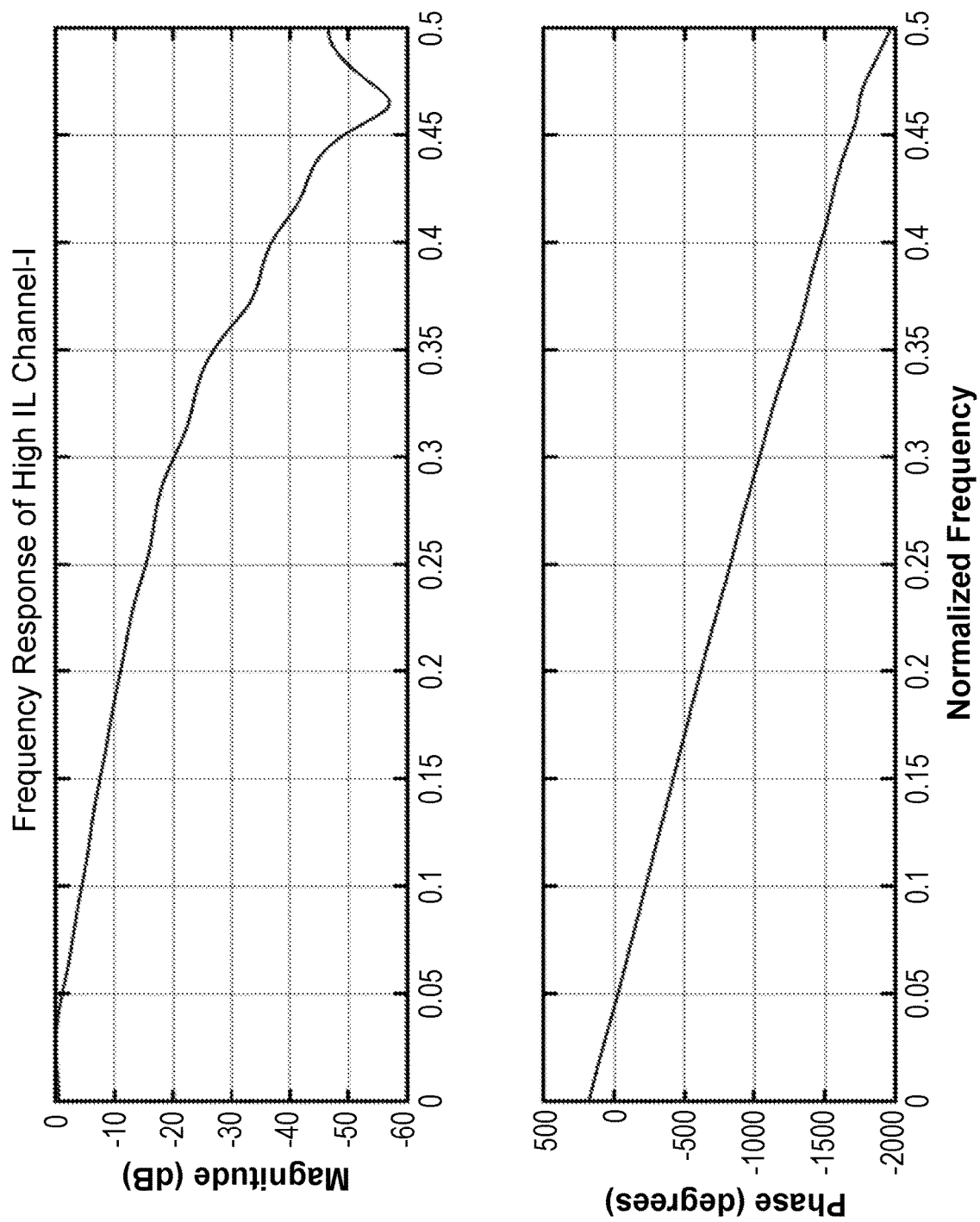
FIG. 15 is an exemplary illustration of a frequency response on a channel with a high Insertion Loss (IL), in accordance with the presently disclosed subject matter.

In FIG. 13, performance results for a typical high IL channel with close to 50 dB attenuation at Nyquist is provided. The full frequency response of this channel is shown in FIG. 15, which is an exemplary illustration of a frequency response on a channel with a high Insertion Loss (IL), in accordance with the presently disclosed subject matter. For comparison, we included results for DFE, optimal (PR2-based) MLSE, and for a system employing PR1 based equalization followed by a corresponding MLSE. In all cases, we assumed a 23-tap LMMSE based equalizer. Based on the results shown in FIG. 13, the BER-SNR curves are flatter compared to the AWGN channel. In terms of the absolute BER loss, we get a factor of 2-4 difference in the worst case compared to MLSE but still this is much better than what we could get using a system based on PR1 equalization.

Figure 14:
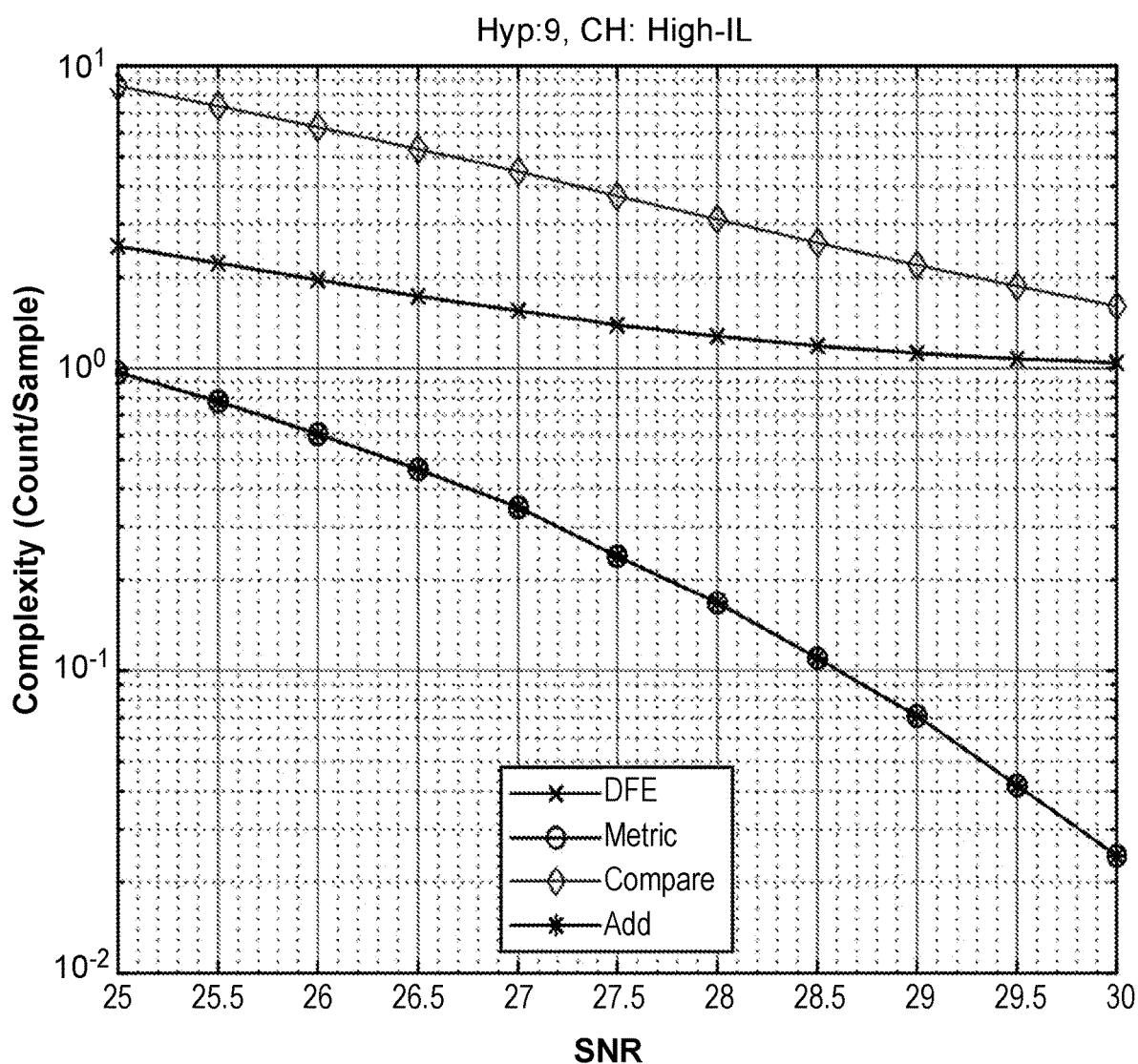
FIG. 14 is an exemplary illustration of an average time complexity analysis for a channel with a high Insertion Loss (IL), in accordance with the presently disclosed subject matter.

FIG. 14 is an exemplary illustration of an average time complexity analysis for a channel with a high Insertion Loss (IL), in accordance with the presently disclosed subject matter.

The time complexity analysis for the above channel is provided in FIG. 14. It can be seen that in the high SNR region (the region where the BER is, for example, below $10^{-4}$), the two configurations execute approximately one DFE and two comparison operations per sample. All other operations are performed at a much lower frequency and should be insignificant.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system comprising a processing circuitry configured to:
    obtain a first ordered sequence of symbols associated with a corresponding second ordered sequence of transmitted symbols and including one or more errors, the errors being discrepancies between given symbols of the first ordered sequence of symbols and corresponding symbols of the second ordered sequence of transmitted symbols;
    determine, for each symbol of the first ordered sequence of symbols, an estimated transmitted symbol, utilizing a Decision Feedback Equalizer (DFE);
    determine if the estimated transmitted symbol of a given symbol of the first ordered sequence of symbols, satisfies a saturation threshold condition; and
    determine an error hypothesis identifying the one or more errors by comparing the estimated transmitted symbol of at least one symbol of the first ordered sequence of symbols with one or more pairs of thresholds.

2. The system of claim 1, wherein the processing circuitry is further configured to:
    calculate the one or more pairs of thresholds, for each symbol within a symbols window comprised of the given symbol, and a predetermined number of symbols preceding the given symbol in the first ordered sequence of symbols, wherein each pair of thresholds is comprised of: (i) a symbol-associated low threshold, and (ii) a symbol-associated high threshold; and characterize each symbol of the symbols window, as potentially erroneous upon the estimated transmitted symbol of the given symbol being below the symbol-associated low threshold of the respective symbol or above the symbol-associated high threshold of the respective symbol, to obtain characterization results.

3. The system of claim 2, wherein each pair of thresholds is associated with a location of the given symbol in the symbols window and with an assumed location of the one or more errors in the symbols window.

4. The system of claim 2, wherein the processing circuitry is further configured to select the error hypothesis from one or more hypotheses determined utilizing the characterization results.

5. The system of claim 4, wherein the selection of the error hypothesis is made by testing the hypotheses in a given order until reaching the error hypothesis that meets a condition, wherein the condition is that upon correcting errors in accordance with the error hypothesis, the estimated transmitted symbol determined for a given number of symbols of the first ordered sequence of symbols, immediately following a first symbol of the symbols window corrected in accordance with the error hypothesis, is not above the symbol-associated high threshold or below the symbol-associated low threshold.

6. The system of claim 5, wherein the given order is a descending order of an amplitude of a difference between the symbols of the first ordered sequence of symbols that are associated with the hypotheses, and the respective estimated transmitted symbols.

7. The system of claim 5, wherein upon none of the error hypotheses meeting the condition, the selection of the error hypothesis is made so that upon correcting errors in accordance with the error hypothesis, a location of the estimated transmitted symbol determined for the given number of symbols of the first ordered sequence of symbols, immediately following the first symbol, that is above the symbol-associated high threshold or below the symbol-associated low threshold, is farthest from the first symbol.

8. The system of claim 2, wherein the symbol-associated low threshold and the symbol-associated high threshold are calculated based on an assumed number of errors within the symbols of the symbols window.

9. The system of claim 8, wherein when the assumed number of errors is one:
(a) the symbol-associated low threshold equals $A_k^n e_n$;
(b) the symbol-associated high threshold equals $M + A_k^n e_n$;
(c) $e_n$ is a sign operator of estimated noise added to the second ordered sequence of transmitted symbols before quantization which gave rise to the first ordered sequence of symbols;
(d) $A_k^n \equiv (-1)^{k-n+1}(k-n+1)$, wherein $\equiv$ signifies a mathematical identity;
(e) n is a location of error within the symbols window;
(f) k is a running index within the symbols window; and
(g) M is a maximal value of the symbols.

10. The system of claim 8, wherein when the assumed number of errors is two:
(a) the symbol-associated low threshold equals $A_k^n e_n + A_k^p e_p$;
(b) the symbol-associated high threshold equals $M + A_k^n e_n + A_k^p e_p$;
(c) $e_n$ and $e_p$ are sign operators of estimated noise added to the second ordered sequence of transmitted symbols before quantization which gave rise to the first ordered sequence of symbols;
(d) $A_k^n \equiv (-1)^{k-n+1}(k-n+1)$, and $A_k^p \equiv (-1)^{k-p+1}(k-p+1)$, wherein $\equiv$ signifies a mathematical identity;
(e) n is a location of a first error within the symbols window;
(f) p is a location of a second error within the symbols window, succeeding the location of the first error;
(g) k is a running index within the symbols window; and
(h) M is a maximal value of the symbols.

11. The system of claim 10, wherein p=n+d, wherein d is a distance between the location of the first error and the location of the second error.

12. The system of claim 2, wherein the first ordered sequence of symbols is obtained by filtering and quantizing a received signal comprising the second ordered sequence of transmitted symbols transmitted via a channel.

13. The system of claim 12, wherein the symbol-associated low threshold and the symbol-associated high threshold are associated with a modulation of the received signal.

14. A method comprising:
obtaining, by a processing circuitry, a first ordered sequence of symbols associated with a corresponding second ordered sequence of transmitted symbols and including one or more errors, the errors being discrepancies between given symbols of the first ordered sequence of symbols and corresponding symbols of the second ordered sequence of transmitted symbols;
determining, by the processing circuitry, for each symbol of the first ordered sequence of symbols, an estimated transmitted symbol, utilizing a Decision Feedback Equalizer (DFE);
determining, by the processing circuitry, if the estimated transmitted symbol of a given symbol of the first ordered sequence of symbols, satisfies a saturation threshold condition; and
determining, by the processing circuitry, an error hypothesis identifying the one or more errors by comparing the estimated transmitted symbol of at least one symbol of the first ordered sequence of symbols with one or more pairs of thresholds.

15. The method of claim 14, further comprising:
calculating, by the processing circuitry, the one or more pairs of thresholds, for each symbol within a symbols window comprised of the given symbol, and a predetermined number of symbols preceding the given symbol in the first ordered sequence of symbols, wherein each pair of thresholds is comprised of: (i) a symbol-associated low threshold, and (ii) a symbol-associated high threshold; and
characterizing, by the processing circuitry, each symbol of the symbols window, as potentially erroneous upon the estimated transmitted symbol of the given symbol being below the symbol-associated low threshold of the respective symbol or above the symbol-associated high threshold of the respective symbol, to obtain characterization results.

16. The method of claim 15, wherein each pair of thresholds is associated with a location of the given symbol in the symbols window and with an assumed location of the one or more errors in the symbols window.

17. The method of claim 15, further comprising selecting the error hypothesis from one or more hypotheses determined utilizing the characterization results.

18. The method of claim 17, wherein the selection of the error hypothesis is made by testing the hypotheses in a given order until reaching the error hypothesis that meets a condition, wherein the condition is that upon correcting errors in accordance with the error hypothesis, the estimated transmitted symbol determined for a given number of symbols of the first ordered sequence of symbols, immediately following a first symbol of the symbols window corrected in accordance with the error hypothesis, is not above the symbol-associated high threshold or below the symbol-associated low threshold.

19. The method of claim 18, wherein the given order is a descending order of an amplitude of a difference between the symbols of the first ordered sequence of symbols that are associated with the hypotheses, and the respective estimated transmitted symbols.

20. The method of claim 18, wherein upon none of the error hypotheses meeting the condition, the selection of the error hypothesis is made so that upon correcting errors in accordance with the error hypothesis, a location of the estimated transmitted symbol determined for the given number of symbols of the first ordered sequence of symbols, immediately following the first symbol, that is above the symbol-associated high threshold or below the symbol-associated low threshold, is farthest from the first symbol.

21. The method of claim 15, wherein the symbol-associated low threshold and the symbol-associated high threshold are calculated based on an assumed number of errors within the symbols of the symbols window.

22. The method of claim 21, wherein when the assumed number of errors is one:
  (a) the symbol-associated low threshold equals $A_k^n e_n$;
  (b) the symbol-associated high threshold equals $M+A_k^n e_n$;
  (c) $e_n$ is a sign operator of estimated noise added to the second ordered sequence of transmitted symbols before quantization which gave rise to the first ordered sequence of symbols;
  (d) $A_k^n \equiv (-1)^{k-n+1}(k-n+1)$, wherein $\equiv$ signifies a mathematical identity;
  (e) n is a location of error within the symbols window;
  (f) k is a running index within the symbols window; and
  (g) M is a maximal value of the symbols.

23. The method of claim 21, wherein when the assumed number of errors is two:
  (a) the symbol-associated low threshold equals $A_k^n e_n + A_k^p e_p$;
  (b) the symbol-associated high threshold equals $M+A_k^n e_n + A_k^p e_p$;
  (c) $e_n$ and $e_p$ are sign operators of estimated noise added to the second ordered sequence of transmitted symbols before quantization which gave rise to the first ordered sequence of symbols;
  (d) $A_k^n \equiv (-1)^{k-n+1}(k-n+1)$, and $A_k^p \equiv (-1)^{k-p+1}(k-p+1)$, wherein $\equiv$ signifies a mathematical identity;
  (e) n is a location of a first error within the symbols window;
  (f) p is a location of a second error within the symbols window, succeeding the location of the first error;
  (g) k is a running index within the symbols window; and
  (h) M is a maximal value of the symbols.

24. The method of claim 23, wherein p=n+d, wherein d is a distance between the location of the first error and the location of the second error.

25. The method of claim 15, wherein the first ordered sequence of symbols is obtained by filtering and quantizing a received signal comprising the second ordered sequence of transmitted symbols transmitted via a channel.

26. The method of claim 25, wherein the symbol-associated low threshold and the symbol-associated high threshold are associated with a modulation of the received signal.

27. A non-transitory computer readable storage medium having computer readable program code embodied therewith, the computer readable program code, executable by at least one processor to perform a method comprising:
  obtaining, by a processing circuitry, a first ordered sequence of symbols associated with a corresponding second ordered sequence of transmitted symbols and including one or more errors, the errors being discrepancies between given symbols of the first ordered sequence of symbols and corresponding symbols of the second ordered sequence of transmitted symbols;
  determining, by the processing circuitry, for each symbol of the first ordered sequence of symbols, an estimated transmitted symbol, utilizing a Decision Feedback Equalizer (DFE);
  determining, by the processing circuitry, if the estimated transmitted symbol of a given symbol of the first ordered sequence of symbols, satisfies a saturation threshold condition; and
  determining, by the processing circuitry, an error hypothesis identifying the one or more errors by comparing the estimated transmitted symbol of at least one symbol of the first ordered sequence of symbols with one or more pairs of thresholds.

* * * * *